US012521794B2

(12) United States Patent
Daigo

(10) Patent No.: US 12,521,794 B2
(45) Date of Patent: Jan. 13, 2026

(54) NI-BASED ALLOY MEMBER INCLUDING ADDITIVELY MANUFACTURED BODY, METHOD FOR MANUFACTURING NI-BASED ALLOY MEMBER, AND MANUFACTURED PRODUCT USING Ni-BASED ALLOY MEMBER

(71) Applicant: Proterial, Ltd., Tokyo (JP)

(72) Inventor: Yuzo Daigo, Tokyo (JP)

(73) Assignee: Proterial, Ltd., Tokyo (JP)

( * ) Notice: Subject to any disclaimer, the term of this patent is extended or adjusted under 35 U.S.C. 154(b) by 762 days.

(21) Appl. No.: 17/432,787

(22) PCT Filed: Mar. 3, 2020

(86) PCT No.: PCT/JP2020/008832
§ 371 (c)(1),
(2) Date: Aug. 20, 2021

(87) PCT Pub. No.: WO2020/179766
PCT Pub. Date: Sep. 10, 2020

(65) Prior Publication Data
US 2022/0001449 A1     Jan. 6, 2022

(30) Foreign Application Priority Data
Mar. 4, 2019   (JP) ................. 2019-038724

(51) Int. Cl.
*B22F 10/28*   (2021.01)
*B22F 10/64*   (2021.01)
(Continued)

(52) U.S. Cl.
CPC ............. *B22F 10/28* (2021.01); *B22F 10/64* (2021.01); *B22F 12/41* (2021.01); *B33Y 10/00* (2014.12);
(Continued)

(58) Field of Classification Search
CPC .... C22C 19/051; C22C 19/055; C22C 1/0433
See application file for complete search history.

(56) References Cited

U.S. PATENT DOCUMENTS 11,939,646 B2 * 3/2024 Vecchio .................... C23C 4/06
2005/0053513 A1 * 3/2005 Pike ....................... C22C 1/0433
148/428

(Continued)

FOREIGN PATENT DOCUMENTS

CN       102181857 A  *  9/2011
CN       104561994 A  *  4/2015
(Continued)

OTHER PUBLICATIONS

Zhang F., et al.; "Effect of heat treatment on the microstructural evolution of a nickel-based superalloy additive-manufactured by laser powder bed fusion", Acta Materialia, p. 200-214; (Year: 2018).*

(Continued)

*Primary Examiner* — Sally A Merkling
*Assistant Examiner* — Austin Pollock
(74) *Attorney, Agent, or Firm* — McDonald Hopkins LLC

(57) ABSTRACT

An additively manufactured body including a Ni—Cr—Mo based alloy that is excellent in mechanical properties. An additively manufactured body of the present invention is a member including a Ni-based alloy that includes Ni at the largest content by a mass ratio, and Cr and Mo at second largest contents by a mass ratio; and includes segregation of Mo in at least a part of a crystal grain(s). This crystal grain(s) has columnar cell structures (CL), and preferably the segregation of Mo exists between adjacent cell structures. A tensile strength of 850 MPa or higher and an elongation of 50% or higher can be obtained.

19 Claims, 11 Drawing Sheets

(51) Int. Cl.
  *B22F 12/41* (2021.01)
  *B33Y 10/00* (2015.01)
  *B33Y 70/00* (2020.01)
  *B33Y 80/00* (2015.01)
  *C22C 1/04* (2023.01)
  *C22C 19/05* (2006.01)

(52) U.S. Cl.
  CPC ............... *B33Y 70/00* (2014.12); *B33Y 80/00* (2014.12); *C22C 19/051* (2013.01); *C22C 19/055* (2013.01); *B22F 2301/15* (2013.01)

(56) References Cited

U.S. PATENT DOCUMENTS

| | | |
|---|---|---|
| 2016/0333444 A1 | 11/2016 | Sugahara et al. |
| 2017/0167000 A1* | 6/2017 | Dial .................. B22F 10/28 |
| 2018/0104740 A1 | 4/2018 | Yamamoto et al. |
| 2018/0333775 A1* | 11/2018 | Nishida .................. B33Y 70/00 |
| 2019/0054533 A1 | 2/2019 | Kenney et al. |
| 2019/0055627 A1* | 2/2019 | Nagatomi ............. C22C 19/055 |

FOREIGN PATENT DOCUMENTS

| | | | | |
|---|---|---|---|---|
| CN | 107119211 A | * | 9/2017 | ............ B22F 1/0048 |
| CN | 107119270 A | * | 9/2017 | ............ B33Y 10/00 |
| CN | 107127343 A | * | 9/2017 | |
| CN | 108480629 A | | 9/2018 | |
| DE | 102016121531 A1 | * | 5/2018 | ............ B22F 1/0003 |
| EP | 3680043 A1 | | 7/2020 | |
| JP | 2008118103 A | | 5/2008 | |
| JP | 2008121048 A | | 5/2008 | |
| JP | 2010001558 A | | 1/2010 | |
| JP | 2015-160965 A | | 9/2015 | |
| JP | 2016-502596 A | | 1/2016 | |
| SG | 11202001546 W | | 3/2019 | |
| WO | WO-02066704 A1 | * | 8/2002 | ............ C10G 9/203 |
| WO | 2016158687 A1 | | 10/2016 | |
| WO | WO-2019049594 A1 | * | 3/2019 | ............ B22F 1/0011 |

OTHER PUBLICATIONS

Anam A.; "Microstructure and mechanical properties of selective laser melted superalloy inconel 625"; University of Louisville Repository; 2018 (Year: 2018).*
Qin L.; "The microstructure and mechanical properties of deposited-IN625 by laser additive manufacturing"; J. of Rapid Prototyping; 1119-1129; 2017 (Year: 2017).*
Arisoy Y.; "Influence of scan strategy and process parameters on microstructure and its optimization in additively manufactured nickel alloy 625 via laser powder bed fusion"; Int. J. Adv Manufac. Tech., 1393-1417; 2017 (Year: 2017).*
Hu Y.L., at al.; "Effect of solution heat treatment on the microstructure and mechanical properties of Inconel 625 superalloy fabricated by laser solid forming"; J. of Alloys and Compounds, 767, 330-334; 2018 (Year: 2018).*
Daigo Y., et al.; "Corrosion Behavior of Additively Manufactured Alloy N06210 in Acidic Solutions", NACE International Corrosion Conference, Apr. 18, 2018 (Year: 2018).*
Gravity Cast; ASTM B619 N06210; retrieved from internet on Oct. 22, 2024 (Year: 2024).*
ATI Materials; "ATI-276, Nickel-base Alloy"; Technical Data Sheet (Year: 2024).*
Silva C.; Assessment of microstructure of alloy Inconel 686 dissimilar weld claddings; J. of Alloys and Compounds; 686, p. 628-642; 2016 (Year: 2016).*
Silva C.; Assessment of microstructure of alloy Inconel 686 dissimilar weld claddings; J. of Alloys and Compounds; 686, p. 628-642; 2016 (Year: 2016) (Year: 2016).*
Seyedmohammad T., et al; Effects of Heat Input and Intertrack Overlap on the Microstructure and Properties of Inconel 686 Weld Overlays; Materials; 2024, 17, 3315 (Year: 2024).*
Special Metals; Inconel Alloy 686; Special Metals Corporation, Feb. 5, 2005 (Year: 2005).*
Lindwall, G. et al: "Simulation of TTT Curves for Additively Manufactured Inconel 625", Metallurgical and Materials Transactions A, Springer US, New York, vol. 50, No. 1, Oct. 17, 2018 (Oct. 17, 2018), pp. 457-467, XP036664497.
Keller, Trevor et al: "Application of Finite Element, Phasefield, and CALPHAD-based Methods to Additive Manufacturing of Nibased Superalloys", arxiv.org, Cornell University Library, 201 Olin Library Cornell University Ithaca, NY 14853, May 4, 2017 (May 4, 2017), XP080946227.
Zhang, Fan et al: "Effect of heat treatment on the microstructural evolution of a nickel-based superalloy additive-manufactured by laser powder bed fusion", Acta Materialia., vol. 152, Jun. 1, 2018 (Jun. 1, 2018), pp. 200-214, XP055974411, GB.
Li, C. et al: "Microstructure evolution characteristics of Inconel 625 alloy from selective laser melting to heat treatment", Materials Science, Elsevier, Amsterdam, NL, vol. 705, Aug. 18, 2017 (Aug. 18, 2017), pp. 20-31 , XP085174423,.
Singapore Office action for application No. 11202109038P dated Nov. 7, 2022.
International Preliminary Report on Patentability for PCT/JP2020/008832 dated Aug. 25, 2021.
Extended European Search Report for PCT/JP2020/008832 dated Oct. 25, 2022.
Di et al., "Research progress of high-temperature nickel-based alloys formed by selective laser melting", Adaptive Manufacturing Technology, Oct. 2018.
First Office Action for Chinese Application No. 202080006940.5 dated Oct. 17, 2022.
Office Action for Japanese Application No. 2022-090627 dated Mar. 28, 2023.
Second Office Action for Chinese Application No. 202080006940.5 dated Apr. 3, 2023.

* cited by examiner

FIG. 1A
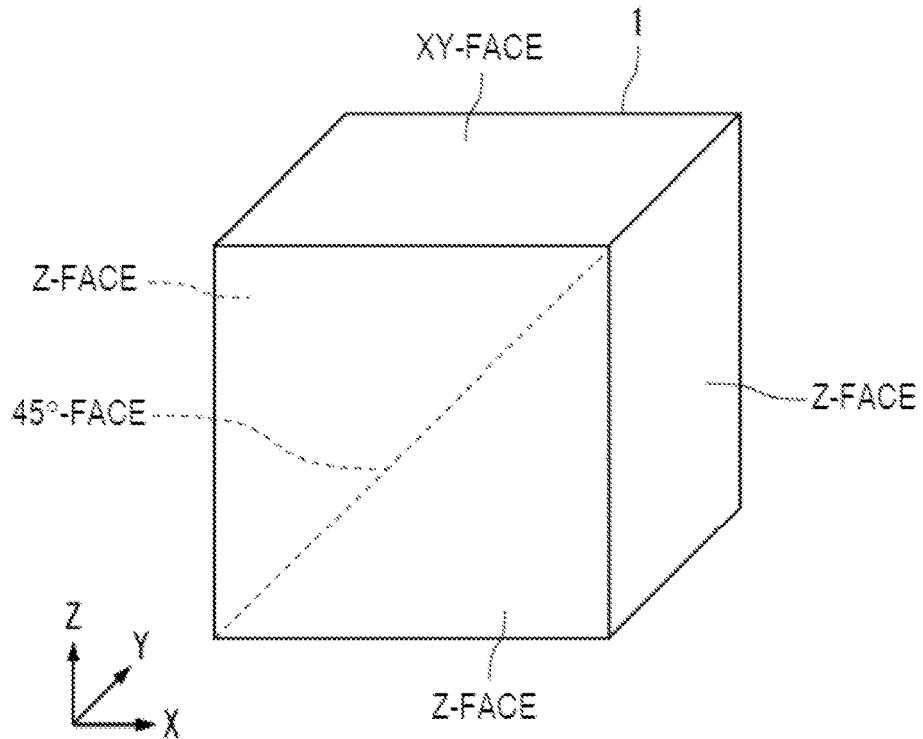
FIG. 1B-2
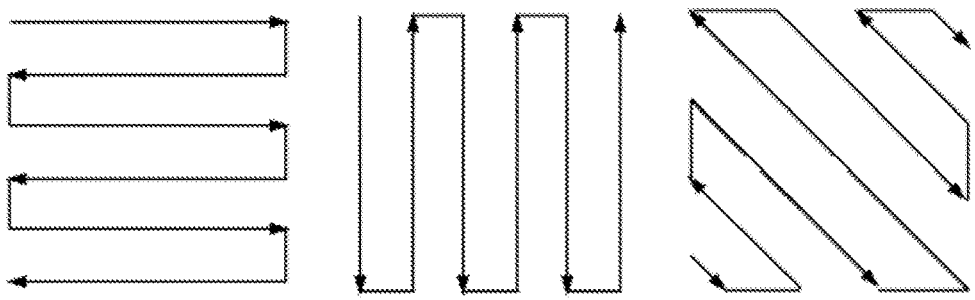
FIG. 1B-1
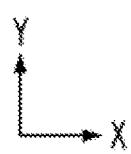
FIG. 1B-4
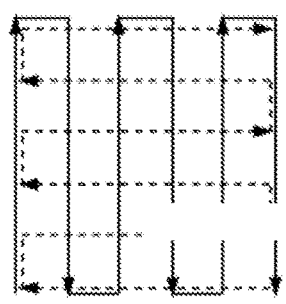
FIG. 1B-3

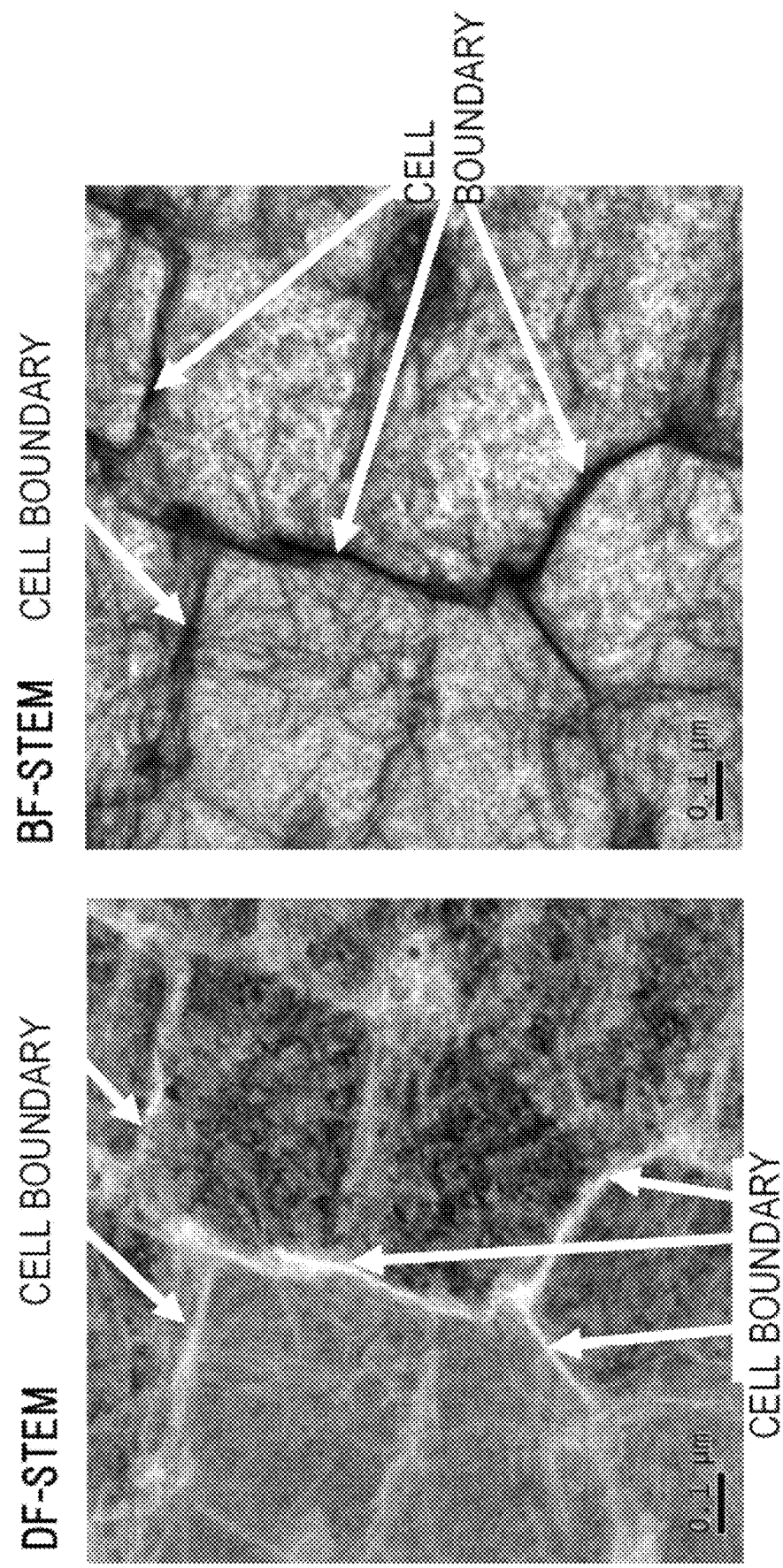

FIG. 4A
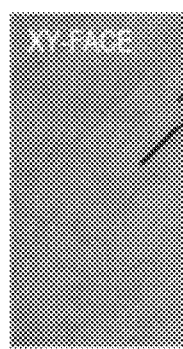
FIG. 4B
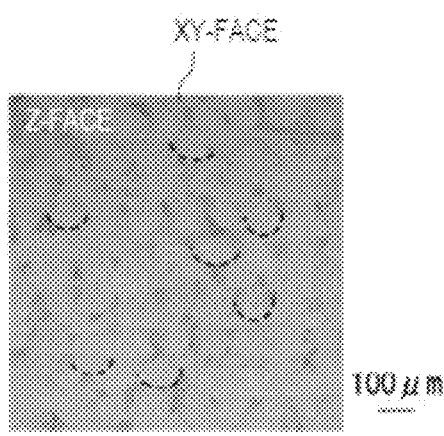
FIG. 4C
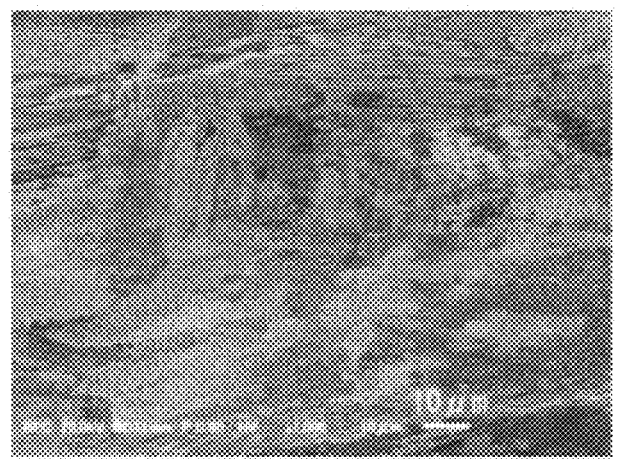
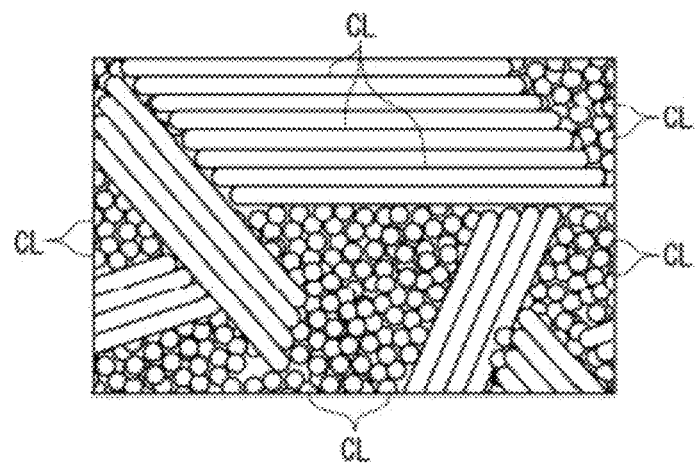
FIG. 4D

FIG. 6A
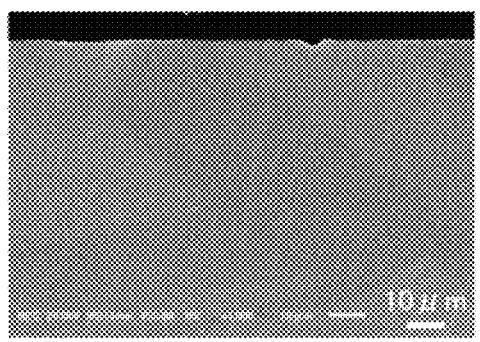
FIG. 6B
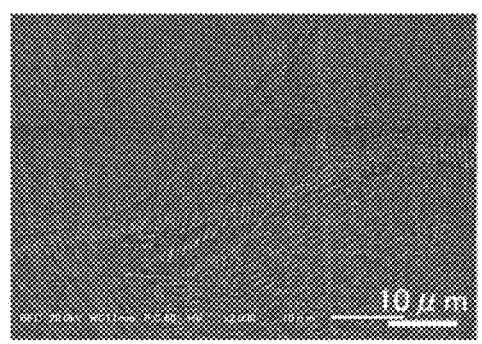
FIG. 6C
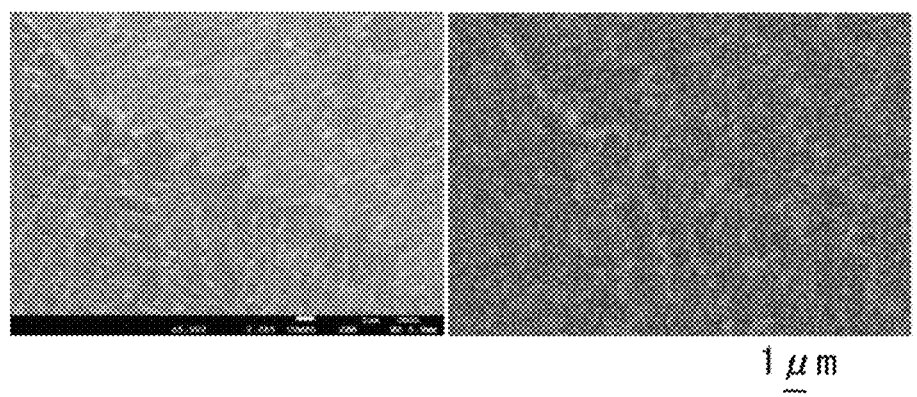
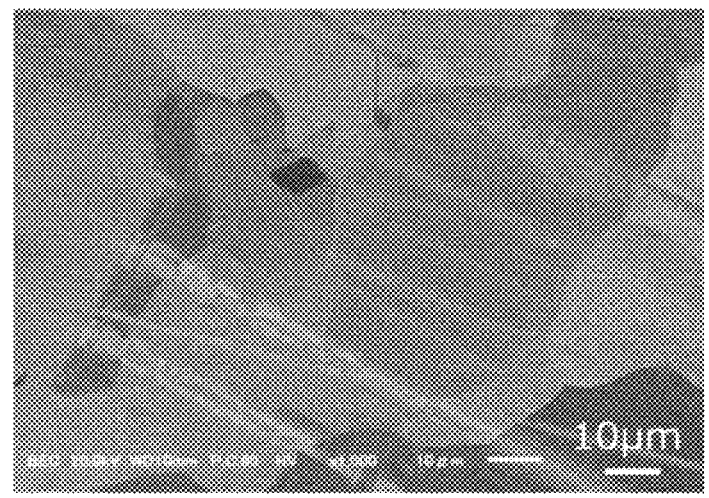
FIG. 6D

NI-BASED ALLOY MEMBER INCLUDING ADDITIVELY MANUFACTURED BODY, METHOD FOR MANUFACTURING NI-BASED ALLOY MEMBER, AND MANUFACTURED PRODUCT USING Ni-BASED ALLOY MEMBER

CROSS-REFERENCE TO RELATED APPLICATIONS

This is a National Stage application of PCT international application PCT/JP2020/0008832, filed on Mar. 3, 2020, which claims the priority of Japanese Patent Application No. 2019-038724, filed Mar. 4, 2019, both of which are incorporated herein by reference in their entirety.

TECHNICAL FIELD

The present invention relates to a Ni-based alloy member including an additively manufactured body, a method for manufacturing a Ni-based alloy member, and a manufactured product using a Ni-based alloy member.

BACKGROUND ART

Conventionally, members and components which are used in chemical plants, semiconductor manufacturing processes, and the like are required to have such corrosion resistance as to endure corrosive environments. Because of this, SUS316L is attempted to be converted to a Ni-based alloy which is better in the corrosion resistance. For example, a Ni-based alloy containing Cr and Mo (Ni—Cr—Mo based alloy) disclosed in Patent Document 1 has been proposed. However, members such as screws for injection molding and drilling devices for oil well, which are used in more severe environments, are required to have high strength, hardness and the like in addition to the corrosion resistance, and required to have excellent mechanical properties. For the Ni—Cr—Mo based alloy of Patent Document 1, it is necessary to further improve the mechanical properties.

In addition, the design of the above described members and components has increased in complexity, and it has also been required to give complicated shapes which are difficult to be manufactured by die forging or machine work. In recent years, the additive manufacturing has been applied to the production of members having the complicated shape.

As disclosed in, for example, Patent Literature 2, the additive manufacturing method includes repeating an operation of melting a raw material powder by supplying a source of heat thereto and solidifying the melt to obtain a three-dimensional shape additively manufactured body. According to the additive manufacturing method, it is possible to obtain a product having a three-dimensional shape in a net shape or a near net shape, even though the shape is complicated. For information, the term "additive manufacturing" is an industry standard term as is defined in ASTM (American Society for Testing and Materials) F2792, as is disclosed in Patent Literature 2.

CITATION LIST

Patent Literature

Patent Literature 1: JP2015-160965A
Patent Literature 2: JP2016-502596A

SUMMARY OF INVENTION

Technical Problem

An additive manufacturing method (Additive Manufacturing: AM) has a great advantage of being able to obtain a product having a three-dimensional shape in a net shape or a near net shape. The additive manufacturing method (hereinafter referred to as additive manufacturing) passes through a process which is different from a conventional process such as melting, casting, forging, rolling, or sintering of metal powder, in the field of metal materials; and thereby a metal additively manufactured body (hereinafter referred to as additively manufactured body or simply as manufactured body) is manufactured.

Then, an object of the present invention is to provide a Ni-based alloy member which is excellent in mechanical properties, a method for manufacturing a Ni-based alloy member, and a manufactured product using a Ni-based alloy member, in addition to obtaining a product having a three-dimensional shape in a net shape or a near net shape, by using the additive manufacturing.

Solution to Problem

A Ni-based alloy member of the present invention is a Ni-based alloy member including: Ni at the largest content by a mass ratio; and Cr and Mo at second largest contents by a mass ratio. The Ni-based alloy member is an additively manufactured body and includes segregation of Mo in at least a part of a crystal grain(s).

In the Ni-based alloy member of the present invention, preferably, the crystal grain(s) has columnar cell structures, and the segregation of Mo exists between the adjacent columnar cell structures.

A Mo concentration in the segregation of Mo is preferably higher than a Mo concentration in a mother phase in the crystal grain(s) by 3 at % or higher.

In the Ni-based alloy member of the present invention, preferably, the average diameter of equivalent circle diameters in cross sections of the columnar cell structures is 1000 nm or smaller.

When the cross sections of the columnar cell structure are observed with a transmission electron microscope, a dislocation density which is obtained by dislocation length/assessed volume (where the assessed volume is observation area×sample thickness) is preferably $10^{12}$ m$^{-2}$ or higher.

In the Ni-based alloy member of the present invention, the mean grain size of the crystal grains is preferably 80 to 150 μm.

In the Ni-based alloy member of the present invention, preferably, the Vickers hardness is 200 HV10 or higher.

In addition, in the Ni-based alloy member of the present invention, preferably, the tensile strength is 850 MPa or higher and elongation is 50% or higher.

The present invention also provides a manufactured product using the above Ni-based alloy member. One example of the manufactured product includes a semiconductor manufacturing apparatus.

The present invention also provides a method for manufacturing a Ni-based alloy member. The manufacturing method includes: a step of obtaining an additively manufactured body including a Ni-based alloy that includes Ni at the largest content by a mass ratio and Cr and Mo at second largest contents by a mass ratio, by additive manufacturing using a laser beam or an electron beam. During melting and solidification in the additive manufacturing, a crystal grain (s) having columnar cell structures is formed, and segregation of Mo is formed between the adjacent columnar cell structures in an inner part of the crystal grain(s).

In the method for manufacturing the Ni-based alloy member according to the present invention, it is preferable that an average diameter of equivalent circle diameters in cross sections of the columnar cell structures is 1000 nm or smaller.

In the method for manufacturing the Ni-based alloy member of the present invention, the additively manufactured body can be subjected to heat treatment at 800° C. or higher and 1300° C. or lower. It is preferable that this heat treatment is performed for 0.5 hours or longer and 3 hours or shorter.

In addition, in the method for manufacturing the Ni-based alloy member of the present invention, aging heat treatment can be performed at 600° C. or higher and lower than 800° C. It is preferable that this aging heat treatment is performed for 20 hours or longer and 100 hours or shorter. An intermetallic compound is deposited by the aging heat treatment.

Advantageous Effect of Invention

According to the present invention, it is possible to provide a Ni-based alloy member which is excellent in mechanical properties in addition to corrosion resistance, and is suitable for obtaining a net shape or a near net shape, a method for manufacturing a Ni-based alloy member, and a manufactured product using a Ni-based alloy member.

BRIEF DESCRIPTION OF DRAWINGS

FIGS. 1A to 1B-4 are views showing a scanning mode of a laser beam or the like in additive manufacturing.

FIG. 2 shows STEM images that have been obtained by observation of an as-built surface (as-built surface: as-is surface after additive manufacturing, which is not subjected to machine work such as polishing and cutting, or heat treatment) of an additively manufactured body with Scanning Transmission Electron Microscopy, the left side being a DF-STEM image, and the right side being a BF-STEM image.

FIG. 4A, FIG. 4B and FIG. 4C each show a photograph of a microstructure of the additively manufactured body after etching, in the present Example, FIG. 4A being a structure of an XY-face observed with an optical microscope, FIG. 4B being a structure of a Z-face observed with an optical microscope, and FIG. 4C being a structure of a Z-face observed with a SEM; and FIG. 4D is a schematic view drawn with reference to FIG. 4C.

FIG. 6A shows a reflected electron image by SEM of a forged and rolled body (unetched), FIG. 6B shows a reflected electron image by SEM of an additively manufactured body 1 (unetched), FIG. 6C shows composition maps of Mo of the additively manufactured body 1, which have been observed by SEM and EDX, respectively, and FIG. 6D shows a reflected electron image by SEM of the additively manufactured body 1 (after etching) after solution treatment. For information, the left side of FIG. 6C is a SEM image of Mo in the manufactured body 1 observed by SEM, and the right side of FIG. 6C is an EDX image of Mo of the manufactured body 1 observed by EDX (Energy Dispersive X-ray Spectroscopy).

DESCRIPTION OF EMBODIMENTS

Figure 3:
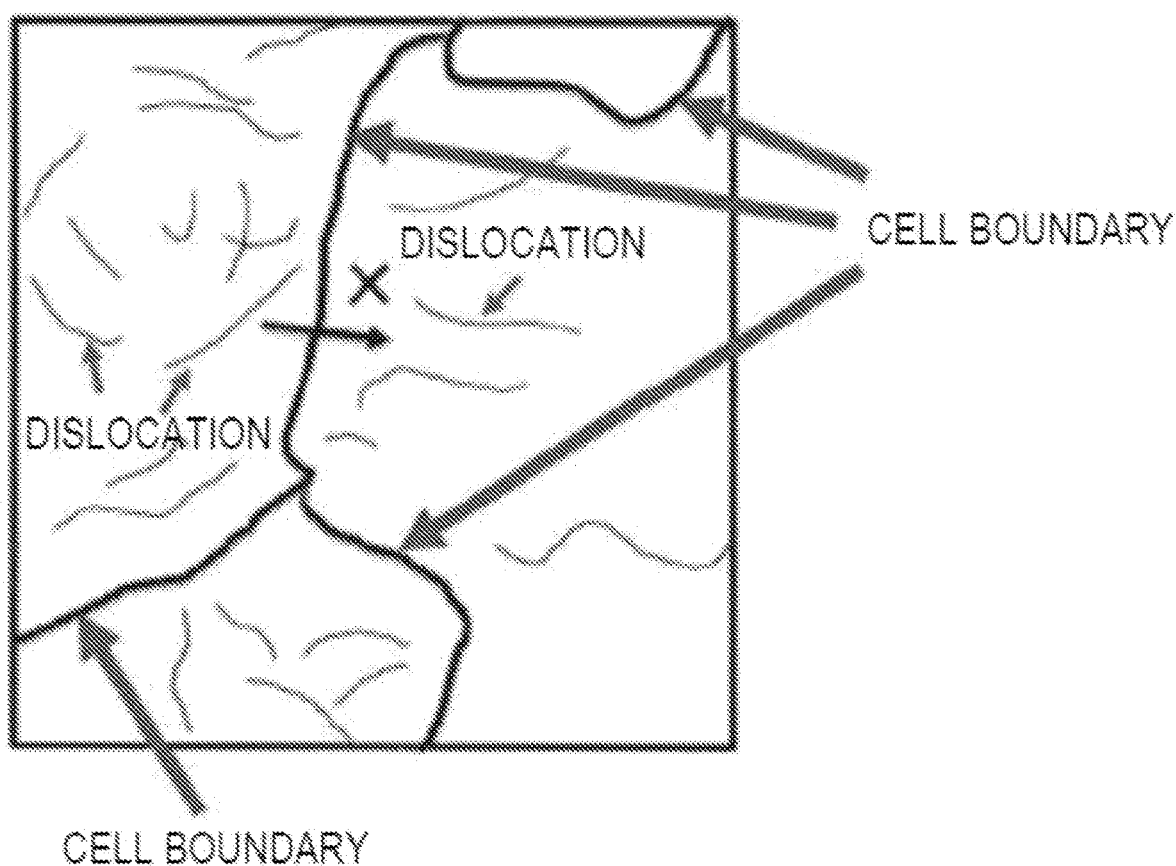
FIG. 3 is an image view for explaining that Mo segregation disturbs movement and bonding of dislocations in cell structures, and is a simplified view of the BF-STEM image shown in FIG. 2.

A Ni-based alloy member according to an embodiment of the present invention will be described below with reference to the accompanying drawings. The Ni-based alloy member according to the present embodiment is an additively manufactured body including a Ni-based alloy that includes: Ni at the largest content by a mass ratio; and Cr and Mo at second largest contents by a mass ratio. The additively manufactured body is mainly characterized by having segregation of Mo in at least a part of a crystal grain(s).

The additively manufactured body will be described below. Firstly, additive manufacturing that can be applied to a member having a net shape or a near net shape will be described, and it will be described that the additively manufactured body according to the present embodiment can obtain higher strength than a Ni-based alloy having the same composition, which has been subjected to forging and rolling. In addition, it will also be described that the corrosion resistance of the additively manufactured body according to the present embodiment can be improved by having an oxide film formed on the surface layer, which contains Cr as a main component. Note that in the present specification, a numerical range expressed by using "to" means to include numerical values described before and after "to", as a lower limit value and an upper limit value.

[Additive Manufacturing]

Additive manufacturing for metal materials can be classified into a powder bed fusion bonding method (PBF) and a directed energy deposition method (DED), but the additively manufactured body of the present embodiment can be manufactured by any of the methods.

The above powder bed fusion bonding method (powder bed method) is a method comprising spreading a metal powder, and melting a portion to be manufactured by a laser beam or an electron beam serving as a heat source, and solidifying the melt (hereinafter referred to as melting and solidification). The powder bed method includes: spreading the metal powder, and forming a solidified layer by the melting and solidification; and repeating this operation to stack the solidified layers and manufacture a member having a predetermined shape. In the powder bed method, there are the following laser beam heat source method and electron beam heat source method.

The laser beam heat source method is a method comprising irradiating a spread metal powder material with a laser beam to additively manufacture the spread metal powder material by the melting and solidification, and there are known a selective laser melting method (SLM) and a selective laser sintering method (SLS). In the laser beam heat source method, the melting and solidification is performed in an inert atmosphere such as nitrogen.

The electron beam heat source method includes irradiating the spread metal powder with an electron beam in a high vacuum to make the electron beam collide with the powder, thereby converting the kinetic energy into heat, and melting the powder. In the electron beam method, the melting and solidification is performed in vacuum. The electron beam heat source method is referred to as a selective electron beam melting method (SEBM) or simply electron beam melting method (EBM).

The directed energy deposition method is referred to as a metal deposition method (LMD), which includes continuously injecting a metal powder to a front position in a direction in which a laser beam or an electronic beam is moved, irradiating the supplied metal powder with the laser beam or the electronic beam to melt the powder and solidify the melt, and thereby manufacturing the additively manufactured body.

The powder bed method has an advantage that the shape precision of the additively manufactured body is high, and on the other hand, the metal deposition method has an advantage that high speed manufacturing is possible. Among the powder bed methods, the SLM is a method of manufacturing the additively manufactured body by selectively melting and solidifying a powder bed of which the multilayer thickness is several tens of μm with the use of a fine laser beam, and stacking the solidified layers; and has a feature of being capable of manufacturing a precision component, compared to other additive manufacturing methods. Accordingly, in the present embodiment, it is preferable to adopt the SLM when additively manufacturing the precision component. At this time, an energy density is appropriately set by selecting conditions from, for example, such conditions that a laser power is 400 W or less, a scanning speed is 7000 mm/s or less, a scanning pitch is 0.06 to 0.15 mm, and a layer thickness is 0.03 to 0.1 mm; and the manufacturing can be performed.

A scanning path of the laser beam or the electronic beam is arbitrary in the powder bed method and the metal deposition method. For example, the additively manufactured body 1 shown in FIG. 1A can be scanned in a predetermined axial direction, for example, in parallel to the X-axis direction and in a reciprocating manner as illustrated in FIG. 1B-1, and for example, in parallel to the Y-axis direction and in a reciprocating manner as illustrated in FIG. 1B-2. The former method may be referred to as an X-scanning method, and the latter method may be referred to as a Y-scanning method. For information, here, examples in which the predetermined axial direction is parallel to the X-axis and the predetermined axial direction is parallel to the Y-axis are shown, but as shown in FIG. 1B-3, the predetermined axial direction may be parallel to a direction intersecting with the X-axis and the Y-axis. These methods may be referred to as uniaxial scanning methods.

In addition, as is illustrated in FIG. 1B-4, a scanning path referred to as an XY-scanning method can be adopted in which a previous layer is manufactured by the X-scanning method and then a next layer is manufactured by the Y-scanning method. In a case where the manufacturing is performed by the uniaxial scanning method in the directions intersecting with each other, the uniaxial scanning method may be referred to as an intersecting scanning method, and the XY-scanning method can be referred to as a pattern of the intersecting scanning method.

Furthermore, though the illustration is omitted, in the present embodiment, a spiral scanning path can be adopted.

Furthermore, the present embodiment can also combine these scanning methods. In other words, the additively manufactured body 1 shown in FIG. 1 has a simple structure of a rectangular solid, but when a member having a three-dimensional shape is formed in a net shape or a near net shape, it is important to adopt a scanning method suitable for the structure of the member. In other words, the additively manufactured body in the present invention should be interpreted in the broadest sense, and the shape, dimension, and specific application of a component, an article and the like are not limited.

As is shown in FIG. 1A, the additively manufactured body 1 is layered in a Z-axis direction (usually vertical direction), and an upper end surface thereof is referred to as an XY-face and each of side surfaces thereof is referred to as a Z-face. Furthermore, as is shown in FIG. 1A, when the additively manufactured body 1 is a cube, a face that divides the additively manufactured body 1 into two at a diagonal line is referred to as a 45°-face.

In addition, in the additively manufactured body 1 shown in FIG. 1, it is preferable to scan the XY-face which is the upper end surface and the Z-face which is the side surface twice or more (for example, twice) with a heat source such as a laser beam, to improve dimensional precision and surface precision. Note that in the second and subsequent scans, the metal powder is not supplied, and only scanning with a laser beam or the like is performed. The XY-face and the Z-face constitute an outer surface of the additively manufactured body 1. The plurality of scans with the laser beam or the like can contribute to improvement in corrosion resistance of the additively manufactured body 1, which will be described later.

[Mechanical Properties]

The additively manufactured body according to the present embodiment has a yield strength, a tensile strength, and hardness, which are improved as compared with a forged and rolled body that is a Ni-based alloy having the same chemical composition and is a material subjected to forging and rolling, as will be shown in Examples described later. In the additively manufactured body in which these mechanical properties are improved, there is segregation of Mo in the structure, specifically, a region in which the concentration of Mo is higher than that in the periphery. It is understood that the Mo segregation functions as a pinning effect of dislocations and thereby improves the mechanical properties. The Mo concentration in the portion where Mo is segregated is higher than the concentration of Mo in the mother phase in the crystal grain, by 3 at % or higher, and more specifically by about 3 to 5 at %. Note that due to the formation of the Mo segregation, a Mo-deficient region having a low Mo concentration is formed in the periphery.

Details will be described later, but the Mo segregation in the present embodiment is not a μ phase which is an intermetallic compound containing Mo, Cr and Ni as constituent elements, but the main component thereof is a simple substance of Mo. The Mo segregation formed in the additively manufactured body does not function as a harmful phase, and can contribute to improvement of mechanical properties. In the Mo segregation in the present embodiment, a grade of the segregation is extremely fine and little, and the quantity is extremely small, and accordingly the lowering of the corrosion resistance is suppressed to such an extent as not to cause a problem.

Next, a mechanism will be described through which the Mo segregation formed in the additively manufactured body can contribute to the improvement of the mechanical properties.

As is described above, in the present application, additive manufacturing using the laser beam or the electron beam shall be adopted. Because the melting and solidification is performed by use of the laser beam or the electron beam, the solidification speed is extremely high, and a fine columnar cell structure is formed in the crystal grain by rapid solidification.

When the structure after solidification is observed, as schematically shown in FIG. 4D, a large number of columnar cells CL gather and form a crystal grain(s). In FIG. 4D, a shape appearing to be circular is also the cell CL; this cell CL appears to be circular because of extending in the depth direction of the paper surface of the figure, but is actually columnar.

In addition, the Mo segregation exists between adjacent cell structures (in boundary between cells CL). Because of the rapid solidification in the additive manufacturing process, dislocations (streaky pattern) are formed in the cell structure. Dislocations in the cell structure move so as to become energetically stable and attempt to form dislocation bonds, but the attempt is hindered by the Mo segregation. As a result, a large number of dislocations which have been formed by the rapid solidification in the additive manufacturing process remain in the cell structure without significantly decreasing, and accordingly, the dislocation density in the cell structure is maintained high. The high dislocation density is considered to lead to improvement in mechanical properties of the additively manufactured body.

Here, FIG. 2 is a STEM image of an as-built surface (as-built surface: as-is surface after additive manufacturing, which is not subjected to machine work such as polishing and cutting, or heat treatment) of the additively manufactured body (manufactured body 1 in Example described later).

For information, a procedure for STEM sample preparation and condition for STEM observation are as follows.
<Procedure for STEM Sample Preparation>
A thin piece was prepared by polishing, and then was microsampled by use of FIB (FB-2100 type manufactured by Hitachi High-Technologies Corporation).
<Condition for STEM Observation>
Thickness of sample: target value of 80 nm
Model of apparatus: model JEM-ARM200F manufactured by JEOL Ltd.
Acceleration voltage: 200 kV In FIG. 2, a portion which is indicated as a white region in the DF-STEM image is indicated as a black region in the BF-STEM image. In the BF-STEM image, a black region which extends obliquely and sharply at substantially the center and a black region which branches therefrom and extends obliquely are cell boundaries, and the Mo segregation exists in at least a part of the cell boundaries. As is described above, the existence of the Mo segregation can be confirmed by the STEM image, which will be described in detail later.

In addition, it is recognized that a large number of white streaks exist in the cell structure in the DF-STEM image, and that a large number of black streaks exist in the cell structure in the BF-STEM image. These streaks are the above described dislocations which have been formed in the cell structure. Here, it is shown that as the number of streaks increases, the dislocation density becomes higher.

FIG. 3 is a view for explaining that the Mo segregation hinders movement and bonding of the dislocation in the cell structure, and this figure is a simplified image view of the BF-STEM image shown in FIG. 2. For example, it is known that when positive and negative dislocations in the cell structure move and meet on the same sliding face, the dislocations disappear. However, in the additively manufactured body according to the present embodiment, the Mo segregation exists in at least a part of the cell boundary, and accordingly, there hardly occurs the dislocations disappearance due to the aforementioned movement and bonding. Accordingly, it is possible to obtain an additively manufactured body in which the dislocation density is maintained at a high level, and accordingly, it is possible to finally obtain an additively manufactured body having high mechanical properties, in particular, high hardness. The dislocation density can be measured by, for example, "dislocation length/assessed volume". In the present application, the assessed volume is calculated by multiplying an observation area by the sample thickness.

In general, the dislocation density $\rho$ in a completely annealed metal material is about $10^9$ to $10^{11}$ m$^{-2}$. In addition, it is known that the dislocation density $\rho$ in a strongly worked metal material is about $10^{14}$ to $10^{16}$ m$^{-2}$. In the additively manufactured body according to the present embodiment, the dislocation density $\rho$ can be set at $10^{14}$ m$^{-2}$ or higher, and further to $10^{16}$ m$^{-2}$ or higher, without being strongly worked.

Examples of indices which indicate mechanical properties include the yield strength, the tensile strength, elongation, drawing, and Vickers hardness (HV).

The additively manufactured body according to the present embodiment, which contains appropriate Mo segregation, can have a yield strength of preferably 400 MPa or higher, more preferably 500 MPa or higher, and further preferably 600 MPa or higher.

In addition, as for the tensile strength, the additively manufactured body according to the present embodiment can show a value of preferably 800 MPa or higher, more preferably 900 MPa or higher, and further preferably 950 MPa or higher.

As for the Vickers hardness (HV10), the additively manufactured body according to the present embodiment can show a value of preferably 200 HV or higher, more preferably 250 HV or higher, and further preferably 300 HV or higher.

The additively manufactured body according to the present embodiment can have an elongation of preferably 40% or higher, more preferably 60% or higher, and further preferably 70% or higher.

In addition, as for the drawing, the additively manufactured body can show a value of preferably 40% or higher, more preferably 50% or higher, and further preferably 60% or higher.

For information, among the above mechanical properties, the yield strength and the tensile strength are indices for determining strength, and the elongation and the drawing are indices for determining ductility. The Vickers hardness (HV) is literally an index for determining the hardness.

The Mo segregation is formed in the inner part of the crystal grain. The Mo segregation is formed in all the crystal grains in some cases, or is also formed in a part of the crystal grains in some cases. The Mo segregation is formed preferably in 70% or more crystal grains of the total number of crystal grains, more preferably in 80% or more crystal grains of the total number of crystal grains, and further preferably in 90% or more crystal grains of the total number of crystal grains.

As described above, in the additively manufactured body, the crystal grain has a plurality of columnar cell structures, and the segregation of Mo exists between adjacent columnar cell structures. The mean grain size of the crystal grains is about 80 to 150 μm, and is further about 10 to 50 μm.

In the columnar cell structure, the average diameter of the cross section is 2500 to 3500 nm, and is further about 300 to 1000 nm (note that dimension here is dimension after heat treatment). The cross section of the columnar cell structure is not a perfect circle, and accordingly, the average diameter of the cross section of the columnar cell structure is calculated as an average diameter of equivalent circle diameters.

The degree of the Mo segregation relates to a size of the columnar cell structure. The finer the columnar cell structure is, the more effectively the pinning effect of dislocations is exhibited due to the Mo segregation existing in the cell boundary. As a result, an additively manufactured body having high strength can be obtained.

The length of the columnar cell structure is about 30 to 80 μm, and is further about 10 to 30 μm.

One crystal grain has about 50 to 1000 columnar cell structures in its inner part.

However, it is not essential that all of the crystal grains constituting the additively manufactured body of the present application have the columnar cell structure.

For information, considering that in the forged and rolled body, the mean grain size of crystal grains is usually 100 to several hundred μm, it is understood that the additively manufactured body has a fine structure.

[Method for Manufacturing Additively Manufactured Body]

Next, a preferable method for manufacturing the additively manufactured body having segregation of Mo of the present application will be described.

This manufacturing method includes a step of obtaining an additively manufactured body including a Ni-based alloy that includes Ni at the largest content by a mass ratio and Cr and Mo at second largest contents by a mass ratio, by additive manufacturing using a laser beam or an electron beam. The basic concept of this manufacturing method is to form crystal grains with a plurality of columnar cell structures and to form segregation of Mo between a plurality of adjacent columnar cell structures in the inner part of the crystal grain, during melting and solidification in the additive manufacturing.

Then, by subjecting the additively manufactured body to the following heat treatment and/or aging heat treatment, the mechanical properties of the additively manufactured body can be appropriately adjusted.

In the present application, the segregation of Mo is intentionally left in the boundaries between the columnar cells existing in the crystal grain, and thereby the mechanical properties of the additively manufactured body are improved on the basis of the above mechanism. Because of this, when the improvement in mechanical properties is strictly expected, it is desirable not to adopt such heat treatment at a high temperature for a long time as to completely vanish the segregation of Mo.

In addition, the following heat treatment and/or aging heat treatment are optionally performed and are not essential steps. As will be described later, an as-manufactured additively manufactured body ("manufactured body 1" in Example described later) which is not subjected to heat treatment or aging heat treatment has both of a yield strength of 600 MPa or higher and a Vickers hardness of 250 HV or higher, and the values exceed the mechanical properties of the forged and rolled body. In the as-manufactured additively manufactured body, values of other mechanical properties (tensile strength, elongation and drawing) are also necessary and sufficient, and the as-manufactured additively manufactured body can be used depending on the application.

(Heat Treatment)

The additively manufactured body can adjust its mechanical properties by being subjected to heat treatment as will be described in Example described later. This heat treatment is performed in air at 800° C. or higher and 1300° C. or lower, more preferably at 800° C. or higher and 1200° C. or lower, and further preferably at 900° C. or higher and 1200° C. or lower. The heat treatment may be held at a temperature in the above range for 10 minutes or longer and 10 hours or shorter, preferably 0.5 hours or longer and 3 hours or shorter, according to a size of the additively manufactured body.

By the conditions of the heat treatment which have been set within the above range, the additively manufactured body can remove its distortion, while leaving appropriate Mo segregation contributing to the improvement of the mechanical properties in the cell boundary. The distortion removal of the additively manufactured body contributes to the improvement of the corrosion resistance of the additively manufactured body.

When the heat treatment temperature is so high as to exceed 1300° C., homogenization of the components proceeds sufficiently, and the Mo segregation disappears which contributes to the improvement of mechanical properties. Because of this, the upper limit of the heat treatment temperature is set at 1300° C., and more preferably at 1200° C.

For information, hereinafter, the heat treatment at a temperature in the range of 1100° C. to 1300° C. is occasionally referred to as solution heat treatment. This is because due to the heat treatment being performed at a temperature in this range, such a process proceeds as to dissolve the alloy components of the material into the mother phase.

The lower limit of the heat treatment temperature is 800° C., preferably 900° C., and more preferably 1000° C. When the temperature is 800° C. or higher, an effect of removing the distortion of the manufactured body can be obtained and an effect of the Mo segregation can be left by the adjustment of the time period.

In addition, it is necessary to appropriately set a time period of the heat treatment based on the heat treatment temperature. For example, in a case where the heat treatment temperature is set in the range of 1200° C. or higher and 1300° C. or lower, the holding time can be set at 10 minutes or longer and 20 minutes or shorter. When the heat treatment temperature is set in the range of 1100° C. or higher and lower than 1200° C., the holding time can be set at 20 minutes or longer and 40 minutes or shorter. When the heat treatment temperature is set in the range of 800° C. or higher and lower than 1100° C., the holding time can be set at 30 minutes or longer and 2 hours or shorter.

(Aging Heat Treatment)

In addition, instead of the above heat treatment or in addition to the above heat treatment, aging treatment can be performed in which the temperature is held at a temperature in the range of 600° C. or higher and lower than 800° C. for a predetermined time. Due to this aging treatment, the additively manufactured body can further improve its strength and hardness.

The time period of the aging treatment is appropriately adjusted according to the temperature of the aging treatment. When the temperature of the aging treatment is 600° C. or higher and lower than 700° C., it is preferable to hold the temperature for 20 hours or longer and 100 hours or shorter, and further for 50 hours or longer. On the other hand, when the temperature of the aging treatment is 700° C. or higher and lower than 800° C., the holding time may be 30 hours or longer and 40 hours or shorter. By the aging treatment, a nano-sized intermetallic compound ($Ni_2(Cr, Mo)$) can be deposited, and by the deposition hardening, the strength can be more improved.

[Corrosion Resistance]

The additively manufactured body according to the present embodiment can improve its corrosion resistance, by having a film including an oxide ($Cr_2O_3$) which contains Cr as a constituent element, on its surface layer. This oxide film is formed in the range of 1 nm to 20 nm from the surface of the additively manufactured body, and preferably has a thickness of 1 nm to 10 nm. The thickness of the oxide film is more preferably 2 to 8 nm, and is further preferably 3 to 5 nm.

The oxide film according to the present embodiment is preferably formed by oxidizing treatment in a high temperature environment and in a low oxygen atmosphere. This oxidizing treatment can be performed during the additive manufacturing. Because the oxide film is formed on the outer surface of the additively manufactured body, the oxidizing treatment which is performed during the additive manufacturing is conducted when the outer surface is manufactured.

In the laser beam heat source system in the powder bed method, as described above, the additive manufacturing is performed in an inert atmosphere such as nitrogen or argon, but if a trace amount of oxygen is contained in this inert gas, the oxidizing treatment can be performed in a process of the additive manufacturing method in which a raw material alloy powder is melted and solidified.

The concentration of oxygen in the oxidizing treatment in the present embodiment is preferably set in the range of 100 ppm to 21%, is more preferably in the range of 100 ppm to 1%, and is further preferably in the range of 100 to 2000 ppm. The oxygen concentration is determined on the basis of the volume.

The temperature in the oxidizing treatment in the present embodiment is preferably in the range of 300 to 1000° C., is more preferably in the range of 400 to 800° C., and is further preferably in the range of 500 to 600° C.

It is preferable to perform the oxidizing treatment at a low oxygen concentration in the above range of the oxygen concentration in order to obtain a dense oxide film, but even when the oxygen concentration is 21%, for example, a dense oxide film can be formed if a low temperature in the vicinity of 200 to 300° C. is selected.

[Alloy Composition]

The additively manufactured body 1 includes a Ni-based alloy that includes Ni at the largest content by a mass ratio and Cr and Mo at second largest contents by a mass ratio. In other words, the additively manufactured body 1 is a Ni—Cr—Mo based alloy member. In the Ni-based alloy according to the present embodiment, Cr, Mo and Ni are referred to as main constituent elements. It is preferable that among the main constituent elements, Cr and Mo are contained in the respective ranges of Cr: 14.5% to 24.5% and Mo: 12.0% to 23.0% by mass %. Note that the content of Ni is specified as the balance with respect to other elements in addition to Cr and Mo.

In the present invention, the alloy composition is not limited as long as the alloy is a Ni-based alloy containing Cr and Mo, but examples of compositions suitable for structural members of semiconductor manufacturing apparatuses which are used in a severe corrosive environment will be described below. A symbol % which indicates a content of a metal element shall mean mass %. In addition, the upper limit value and the lower limit value can be arbitrarily combined.

[Cr: 14.5% to 24.5%]

Cr has an effect of improving corrosion resistance against halogen-based gases such as HCl, $Cl_2$, HF, $F_2$, $NF_3$, $ClF_3$ and HBr which are used in the semiconductor manufacturing apparatuses. In particular, when the structural member of the semiconductor manufacturing apparatus once comes into contact with the outside air at the time of being opened, moisture originating from the atmosphere adsorbs to the metal surface, and when a halogen-based process gas is hydrated by the adsorbed moisture, electrochemical corrosion occurs. Against the hydrated acid, Cr exhibits the corrosion resistance, particularly in a region in which the concentration is relatively low. In this case, it is necessary that Cr in an amount of 14.5% or more is contained, but when Cr in an amount exceeding 24.5% is contained, phase stability in combination with Mo is impaired at the time of the additive manufacturing, and it becomes difficult to maintain the single phase. Then, a coarse μ phase results in being formed, which leads to deterioration in the corrosion resistance; accordingly, it is preferable that the content thereof is controlled to 14.5% to 24.5%.

The upper limit of Cr is more preferably 22.5%, and is further preferably 20.5%. In addition, the lower limit of Cr is more preferably 15.0%, and is further preferably 18.0%.

[Mo: 12.0% to 23.0%]

Similarly to Cr, Mo has an effect of improving the corrosion resistance against the halogen-based gases such as HCl, $Cl_2$, HF, $F_2$, $NF_3$, $ClF_3$ and HBr. Against the hydrated acid, Mo exhibits the corrosion resistance, particularly in a region in which the concentration is medium to high. In order to cope with the region, it is preferable that Mo in an amount of 12.0% or more is contained. However, when the content exceeds 23.0%, Mo is inferior in an oxidation property at high temperature. Because of this, when the powder is manufactured by a gas atomization method, an oxide film formed on the surface of each powder becomes thick; and there is a concern that a defect originating in the oxide becomes apparent in the additively manufactured body which is manufactured by use of the powder. Because of this, it is preferable to control the content thereof to 12.0% to 23.0%.

The upper limit of Mo is preferably 20.5%, and is further preferably 19.5%. In addition, the lower limit of Mo is preferably 14.0%, and is more preferably 16.0%.

[Other Elements]

The Ni-based alloy in the additively manufactured body of the present embodiment has a basic composition of Cr: 14.5% to 24.5%, Mo: 12.0% to 23.0%, and the balance being Ni and unavoidable impurities. In the case where the Ni-based alloy according to the present embodiment contains Cr, Mo and Ni, the alloy can contain another optional element as needed, for example, such as Ta, in addition to the main constituent elements. The optional element will be described below.

[Ta: 2.5% or Less]

Ta has an effect of improving corrosion resistance in a reductive acid and an oxidative acid, and corrosion resistance against pitting corrosion and crevice corrosion; and accordingly is contained in the range of 1.0% to 2.5%, as needed.

[W: 5% or Less]

Similarly to Mo, W has an effect of improving the corrosion resistance against the reductive acid; at the same time, increases the melting point, and thereby increases the viscosity of the molten metal; and when producing the powder, makes it easy to control a particle size, and also can suppress the production of a fine powder (particle size smaller than 5 μm) which is difficult to be additively manufactured. Because of this, W is contained in the range of 2% to 5%, as needed.

The following elements can be contained which are 7.00% or less Fe, 2.500% or less Co, 0.040% or less N, 0.50% or less Mn, 0.010% or less Mg, 0.200% or less Si, 0.500% or less Al, 0.500% or less Ti, 0.250% or less Cu, 0.300% or less V, 0.0050% or less B, 0.0200% or less Zr, 0.0300% or less O, and the like.

As for other unavoidable impurities, C forms a carbide with Cr in the vicinity of crystal grain boundaries and increases deterioration of corrosion resistance. Because of this, it is preferable to control C to less than 0.05%. In addition, S and P are segregated in grain boundaries, and cause hot cracking; and accordingly, it is preferable to suppress S and P to less than 0.01%.

In addition, the content of these unavoidable impurities is preferably small, and may be 0%.

[Raw Material Alloy Powder]

The Ni-based alloy according to the present embodiment has the above composition, and a raw material alloy powder having the above composition is prepared in order to manufacture the additively manufactured body. The chemical composition of the raw material alloy powder is basically the same as the chemical composition of the additively manufactured body, but when the additively manufactured body has an oxide film having excellent corrosion resistance on the surface layer, an oxygen content of the additively manufactured body is larger than that of the raw material alloy powder. The oxide film will be described later.

The chemical compositions of the raw material alloy powder and the additively manufactured body can be measured with an analysis by fluorescent X-ray or an analysis by high-frequency inductively coupled plasma (ICP). In addition, the contents of C, S, N and O can be determined by implementation of gas analysis using a combustion method.

The additive manufacturing method is a manufacturing method which provides a desired shape by repeating the melting and solidification for individual powders; but when the particle size of the raw material alloy powder is too small, it becomes difficult to obtain a volume necessary for one time of the melting and solidification, and accordingly, it is difficult to obtain a sound additively manufactured body. On the other hand, when the particle size of the raw material alloy powder is too large, the volume necessary for one time of melting and solidification becomes large, and it is difficult to obtain the sound additively manufactured body. Accordingly, the particle size of the raw material alloy powder to be used is in the range of approximately 5 to 500 μm, but the particle size distribution to be required is different between the powder bed method and the metal deposition method. In the powder bed method, a particle size d50 is preferably 10 to 60 μm, which corresponds to 50 vol % of an integrated value in an integration distribution curve that shows a relationship between a particle size and an integrated volume from the small particle size side, which is obtained by a laser diffraction method. In addition, in the metal deposition method, the particle size d50 is preferably 30 to 250 μm.

The raw material alloy powder can be manufactured by use of a gas atomization method, a water atomization method, a jet atomization method or the like. The raw material alloy powder is preferably spherical, and accordingly, it is preferable to produce the raw material alloy powder by a gas atomization method.

[Application]

The application of the additively manufactured body according to the present embodiment is arbitrary. The additively manufactured body can be used for applications requiring high strength and high corrosion resistance, even in as-additively-manufactured state, and mechanical properties according to applications can be obtained depending on whether or not heat treatment or aging heat treatment is performed.

As an example of the application, the additively manufactured body according to the present embodiment can be applied to a semiconductor manufacturing apparatus that handles a halogen-based gas having strong corrosiveness, which is typified by HCl, $Cl_2$, HF, $F_2$, $NF_3$, $ClF_3$, HBr and the like. In particular, the additively manufactured body is preferably applied to a member of a semiconductor manufacturing apparatus with which these gases directly come in contact. In addition, as other applications, the additively manufactured body according to the present embodiment is preferably applied to: a screw or a cylinder for injection molding; a valve or a joint for a drilling device for oil well or in a chemical plant in which a corrosive fluid flows; a turbine hole of a heat exchanger, a pump, a generator or the like; an impeller of a compressor; and the like. In the present invention, these machines, devices, members, components and the like are collectively referred to as manufactured products.

On the surface of the additively manufactured body having an oxide film according to the present embodiment, a portion on which the oxide film is provided is preferably selected, according to a member of an application to which the additively manufactured body is applied. Specifically, when the whole of the member comes in contact with a corrosive environment such as a corrosive gas or liquid, the oxide film according to the present embodiment is preferably formed on the whole of the member. In addition, when only a part of the member comes in contact with the corrosive environment such as the corrosive gas or liquid, the oxide film according to the present embodiment is preferably formed only on the part. In this way, the oxide film can be formed so as to correspond to the face which comes in contact with the corrosive environment. Of course, even when only a part of the member becomes the face which comes in contact with the corrosive environment such as the corrosive gas or liquid, the oxide film according to the present embodiment may be formed on the whole of the member. In addition, in order to form a bonding face with another member, a part of the oxide film may be subjected to machine work such as polishing or grinding, and in this case, the oxide film may become only a part due to the machine work.

In the present embodiment, the surface on which the oxide film is formed is a face of as-additively-manufactured state (as built face), which has not been subjected to the machine work such as the polishing and cutting.

Examples

The present invention will be specifically described below based on Examples.

A raw material alloy powder for the additive manufacturing was prepared, which had a chemical composition shown in Table 1. This raw material alloy powder was produced by operations of: preparing a raw material to be melted; melting the raw material with the use of a normal high-frequency vacuum melting furnace; thereby producing a mother alloy; and subjecting the mother alloy to a gas atomization process in an argon atmosphere. In addition, powder having particle sizes of 10 to 60 μm was classified from the atomized powder, and subjected to the additive manufacturing. Particle sizes d10, d50 and d90 of the classified powder are d10: 15.6 μm, d50: 25.3 μm, and d90: 50.2 μm, respectively.

TABLE 1

|  | Mass % | | | | Ni + unavoidable |
| --- | --- | --- | --- | --- | --- |
|  | Mo | Cr | Ta | O | impurities |
| Alloy powder | 18.9 | 19.3 | 1.69 | 0.008 | Bal. |
| Additively manufactured body | 18.9 | 19.3 | 1.69 | 0.02 | Bal. |

The additive manufacturing was performed under the following conditions, and an additively manufactured body 1 (30 mm×30 mm×5 mm) was produced (hereinafter, the additively manufactured body may be simply referred to as manufactured body). In a shielding gas (argon gas) in the additive manufacturing, 540 ppm of oxygen is contained.

Additive manufacturing apparatus: EOS M290 (SLM method)
Additive Manufacturing Conditions:
so that energy density becomes 20 to 200 J/mm$^3$,
energy density=laser power (W)/(scanning speed (mm/s)×scanning pitch (mm)×layer thickness (mm)) is set.

In the Examples, the laser power was 300 W, the scanning speed was 800 mm/s, the scanning pitch was 0.1 mm, the layer thickness was 0.04 mm, and therefore, the energy density was 94 J/mm$^3$.
Atmosphere: Ar (O$_2$<0.10%)
Scanning method: crossing scanning method (however, surface XY-face and Z-face are scanned two times with laser beam)

The chemical composition of the manufactured body 1 was also analyzed. The result is shown in Table 1, and the content of oxygen (O) becomes remarkably high. This is understood to be based on the fact that the shield gas (argon gas) in the additive manufacturing contains 540 ppm of oxygen.

For information, the composition of Mo, Cr and Ta was analyzed by Simultix10 (manufactured by Rigaku Corporation), which is an X-ray fluorescence spectrometer. In addition, the composition analysis of O (oxygen) was performed by ON-836 (manufactured by LECO Japan Corporation) which is an oxygen nitrogen analyzer.

[Mechanical Properties]

Next, the manufactured body 1, the manufactured bodies 2 to 4 which were obtained by subjecting the manufactured body 1 to heat treatment, and a forged and rolled body which passed through forging and rolling and had the same chemical composition as that of the manufactured body 1 were prepared, and the mechanical properties and dislocation density were measured. The results are shown in Table 2.

The heat treatment conditions for the manufactured bodies 2, 3 and 4 are as follows.

Manufactured body 2: held at 1180° C. for only 30 minutes in the air.
Solutionizing proceeds due to this heat treatment, and accordingly the heat treatment for the manufactured body 2 is referred to as "solution heat treatment".
Manufactured body 3: held at 900° C. for only 30 minutes in the air.
The heat treatment of the manufactured body 3 is performed mainly for the purpose of strain relief.
Manufactured body 4: held at 650° C. for 60 hours in the air.
The heat treatment for the manufactured body 4 is referred to as "aging heat treatment".

In addition, the mechanical properties were measured in accordance with JIS (JIS Z 2244). The Vickers hardness HV is a measured value at a load 10 Kg. The XY-face and the Z-face in Table 2 comply with the definitions which were described with the use of FIG. 1. The same is applied to the following.

(Measurement of Dislocation Density)

The dislocation density of each sample was determined by "dislocation length/assessed volume".

The dislocation length was determined by actual measurement of each of dislocations which could be observed in the STEM image (observation areas: 4.32 μm$^2$ (1.44 μm$^2$×3 sheets)), and as the total length thereof.

The assessed volume was determined by "observation area×sample thickness". For each sample, the preparation conditions of the STEM sample are the same as those described above, and the sample thickness is 80 nm.

As shown in Table 2, it is understood that the manufactured body 1 formed by the additive manufacturing can obtain mechanical properties which exceed those of the forged and rolled body. In addition, according to the result of the manufactured body 2, the elongation can be brought close to that of the forged and rolled body by the solution heat treatment being performed.

When the manufactured body 2 (1180° C.×30 minutes) and the manufactured body 3 (900° C.×30 minutes) are compared, the manufactured body 3 has higher yield strength and higher Vickers hardness. Therefore, it has been confirmed that heat treatment is effective in a temperature range of 800° C. or higher and 1000° C. or lower, and further, of 850° C. or higher and 950° C. or lower, when these mechanical properties are regarded as important.

The manufactured body 4 (650° C.×60 hours) has the highest Vickers hardness among all the samples in Table 2, and the value reaches 350 HV or higher. The manufactured body 4 has all of a yield strength of 650 MPa or higher, a tensile strength of 1000 MPa or higher, and a Vickers hardness of 350 HV or higher, while maintaining a necessary level of ductility (elongation and drawing).

In other words, the required mechanical properties can be satisfied, when the presence or absence of the heat treatment and the conditions of the heat treatment are appropriately selected.

In addition, when the manufactured body 2 (1180° C.×30 minutes) which was subjected to the solution heat treatment was further subjected to aging heat treatment under the same conditions as those of the manufactured body 4, a hardness of about 300 HV was obtained in HV10 (load 10 Kg).

Next, when the dislocation densities in Table 2 are focused on, it is understood that the dislocation densities of the manufactured body 1 to the manufactured body 4 (6.3×10$^{12}$ m$^{-2}$ to 2.4×10$^{17}$ m$^{-2}$) greatly exceed the dislocation density of the forged and rolled body (8.2×10$^9$ m$^{-2}$). Among the manufactured body 1 to the manufactured body 4, the manufactured body 1 which is not subjected to the heat treatment and the aging heat treatment has the highest dislocation density, and the manufactured body 4 which has been subjected to the aging heat treatment (650° C.×60 hours) has the second highest dislocation density. The manufactured bodies 1 and 4 having a high dislocation density also have high values of the yield strength, the tensile strength and the Vickers hardness; and accordingly, it is considered that there is a correlation between the dislocation density and these mechanical properties.

The manufactured body 2 (1180° C.×30 minutes) and the manufactured body 3 (900° C.×30 minutes) have lower dislocation densities than the manufactured body 1 and the manufactured body 4, but still show dislocation densities of $10^{12}$ m$^{-2}$ or higher, and have higher values of the yield strength, the tensile strength and the Vickers hardness than the forged and rolled body.

forged and rolled body. In addition, according to FIG. 5B, the corrosion resistance does not depend on the layered direction.

(2) Pitting Corrosion Test

A critical temperature was determined at which pitting corrosion occurred when a test piece was immersed in an aqueous solution of ferric chloride, in accordance with JIS G0578. The results are shown in Table 3, and the critical temperatures of test pieces which are not polished become higher by about 5 to 10° C. The manufactured body 1 which is not polished shall be referred to as a manufactured body 1A, and the manufactured body 1 which is polished shall be referred to as a manufactured body 1B.

In addition, a crevice corrosion test was performed in the same manner, and the same results as in Table 3 were obtained.

TABLE 2

| | Tensile direction | Yield strength (MPa) | Tensile strength (MPa) | Elongation (%) | Drawing (%) | Vickers hardness (HV10) | Dislocation density (dislocation length/assessed volume) (m$^{-2}$) |
|---|---|---|---|---|---|---|---|
| Manufactured body 1 | Z | 623 | 885 | 60 | 63 | 282 (XY-face) | 2.4 × 10$^{17}$ |
| | XY | 754 | 1023 | 45 | 46 | 323 (Z-face) | |
| Manufactured body 2 | Z | 416 | 890 | 76 | 63 | 206 (XY-face) | 6.3 × 10$^{12}$ |
| | XY | 424 | 905 | 72 | 59 | 209 (Z-face) | |
| Manufactured body 3 | Z | 530 | 882 | 64 | 68 | 262 (XY-face) | 1.7 × 10$^{14}$ |
| | XY | 618 | 939 | 59 | 58 | 275 (Z-face) | |
| Manufactured body 4 | Z | 689 | 1014 | 48 | 49 | 382 (XY-face) | 3.3 × 10$^{16}$ |
| | XY | 786 | 1120 | 42 | 41 | 395 (Z-face) | |
| Forged and rolled body | | 381 | 812 | 72 | 69 | 180-200 | 8.2 × 10$^{9}$ |

Manufactured body 2: manufactured body 1 subjected to solution treatment (1180° C. × 30 min.)
Manufactured body 3: manufactured body 1 subjected to heat treatment (900° C. × 30 min.)
Manufactured body 4: manufactured body 1 subjected to aging heat treatment (650° C. × 60 hours)
Forged and rolled body: material which has the same chemical composition as manufactured body 1 and has passed through forging and rolling processes
Characteristics: average value of three test pieces

[Corrosion Resistance]

Next, corrosion resistance was evaluated by use of the manufactured body 1 and the forged and rolled body.

The corrosion resistance was evaluated by two types of tests which were a corrosion resistance test by immersion in an aqueous solution of hydrochloric acid and a pitting corrosion test. In the evaluation test for the corrosion resistance, the XY-face, the 45°-face and the Z-face refer to the XY-face, the 45°-face and the Z-face which are shown in the additively manufactured body in FIG. 1.

(1) Hydrochloric Acid Immersion Test

The samples were each immersed in two types of corrosive solutions (1% aqueous solution of hydrochloric acid (boiling) and 5% aqueous solution of hydrochloric acid (boiling)) for 24 hours, and each corrosion rate (mm/year) was determined. The results are shown in FIG. 5. For information, in the case where polishing was performed, any test piece was polished by use of a polishing paper of No. 1000, and then immersed in the corrosive solution.

Figure 5A:
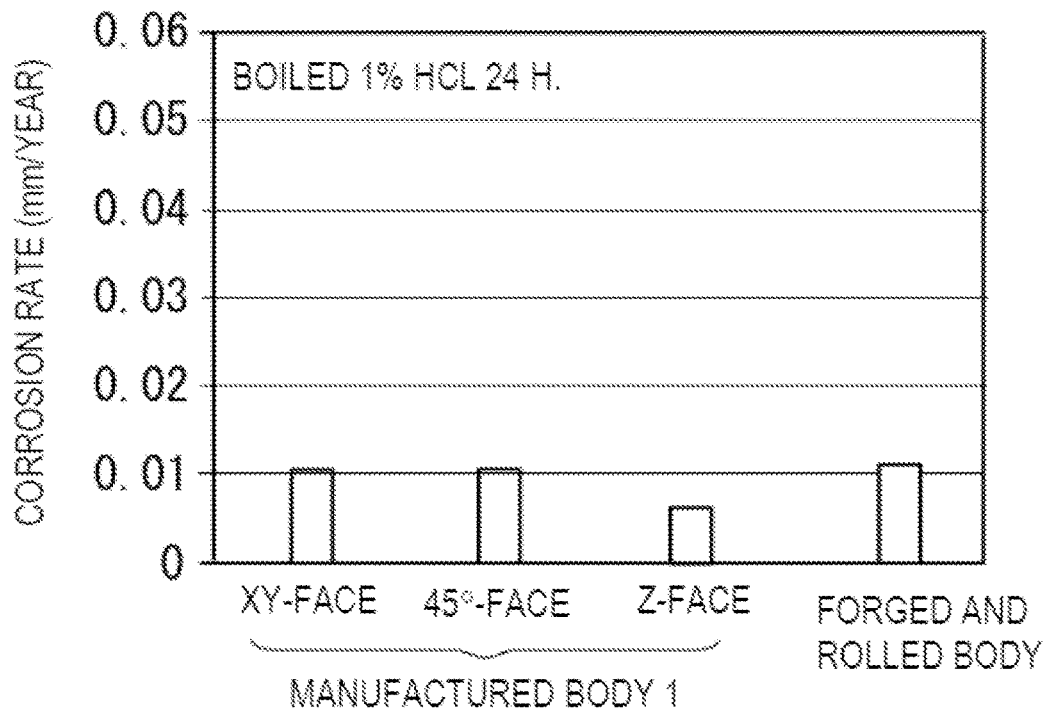
FIGS. 5A and 5B are graphs showing results of a corrosion test in Example of the present invention.
Figure 5B:
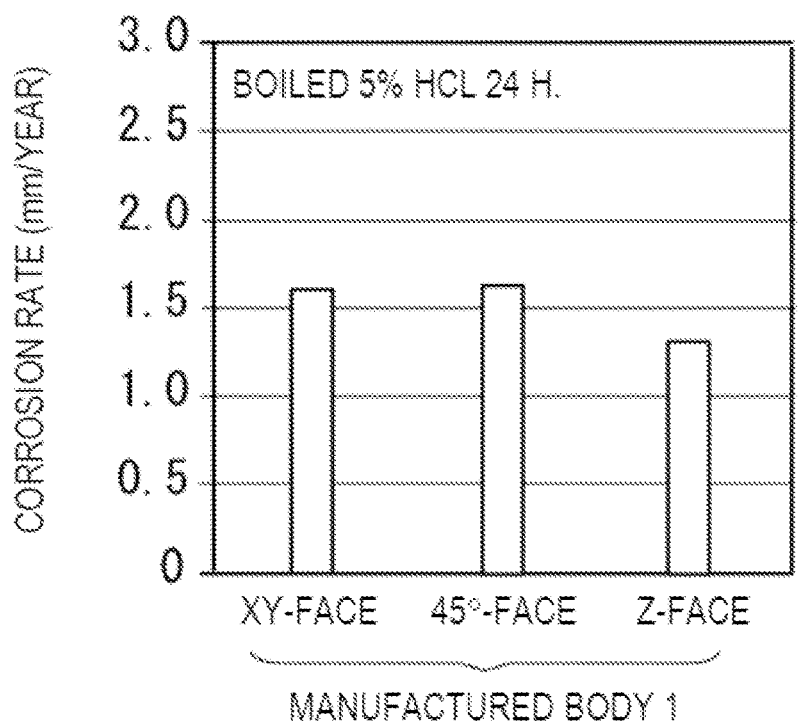

As shown in FIG. 5A, there is no significant difference in the corrosion rate between the manufactured body 1 and the

TABLE 3

| Test temperature | | Unpolished XY-face 1A | Polished XY-face 1B | Unpolished Z-face 1A | Polished Z-face 1B | Forged and rolled body |
|---|---|---|---|---|---|---|
| | 145° C. | ?* | — | ? | x | ?* |
| | 140° C. | ? | x | ? | ? | ? |
| | 135° C. | ? | ? | ? | ? | ? |
| | 130° C. | ? | ? | ? | ? | ? |
| | 125° C. | ? | ? | ? | ? | ? |
| | 120° C. | ? | ? | ? | ? | ? |
| | 115° C. | ? | ? | ? | ? | ? |
| Test surface Exposed surface | | \multicolumn{2}{c}{Manufactured body 1} | | | |

*Test was closed.
xPoor Pitting corrosion occurred.

The above evaluation results are summarized as follows.

(1) Mechanical Properties

The additively manufactured body has the remarkably improved yield strength, tensile strength and hardness, as compared with the forged and rolled body.

As shown in Table 2, according to the additively manufactured body (manufactured body 1) of the present embodiment, it was possible to have all of a yield strength of 600

MPa or higher, a tensile strength of 850 MPa or higher, and a Vickers hardness of 250 HV or higher, in a state of not being subjected to the heat treatment.

In addition, according to the additively manufactured body (manufactured body 2) that has been subjected to the solution heat treatment, it was possible to have all of a yield strength of 400 MPa or higher, a tensile strength of 850 MPa or higher, and a Vickers hardness of 200 HV or higher, while maintaining an elongation of 70% or higher.

According to the additively manufactured body (manufactured body 3) that has been subjected to the heat treatment for strain relief, it was possible to have all of a yield strength of 500 MPa or higher, a tensile strength of 850 MPa or higher, and a Vickers hardness of 250 HV or higher, while maintaining an elongation of 50% or higher.

As for the additively manufactured body (manufactured body 4) which has been subjected to the aging heat treatment, the hardness was significantly improved, and a Vickers hardness of 350 HV or higher could be obtained. At the same time, it was possible to obtain a yield strength of 600 MPa or higher, a tensile strength of 1000 MPa or higher, and elongation and drawing each of 40% or higher.

It should be noted that, in consideration of the fact that the forged and rolled body shown in Table 2 is solutionized, even if the forged and rolled body is further subjected to the heat treatment at 800° C. or higher and 1300° C. or lower, which is recommended in the present application, a dramatic improvement in mechanical properties cannot be expected.

As shown in Table 2, according to the additively manufactured bodies (manufactured bodies 1 to 4) of the present embodiment, high dislocation densities of $10^{12}$ m$^{-2}$ or higher and further $10^{14}$ m$^{-2}$ or higher could be obtained. The manufactured bodies 1 to 4 have higher dislocation densities than the forged and rolled body, and it is considered that this contributes to a remarkable improvement in the yield strength, the tensile strength and the hardness.

(2) Corrosion Resistance

Even though the additively manufactured bodies have the same chemical composition and are additively manufactured under the same conditions, the additively manufactured body which is not polished is more excellent in the corrosion resistance.

In the following, observations will be described which have been performed so as to clarify factors by which the evaluation results of the above mechanical properties and corrosion resistance are obtained.

[Structure Observation of Manufactured Body 1]

An observation result of the structure of the manufactured body 1 will be described. This observation was performed mainly for recognizing the reason why the mechanical strength was improved.

FIGS. 4A and 4B show observation results of the XY-face and the Z-face of the manufactured body 1 after polishing and etching, which were observed with an optical microscope.

As shown in FIG. 4A, linear boundaries with an interval of approximately 100 μm were observed on the XY-face. This is understood to correspond to the boundary with another scanning path when the laser beam has scanned the XY-face. In FIG. 4A, the linear boundary is indicated by the broken line, and a scanning direction of the laser beam is indicated by the arrow.

Next, as shown in FIG. 4B, a semicircular boundary was observed on the Z-face. This boundary is understood to correspond to the boundary on the bottom face side of the molten pool which has been formed when having been scanned by the laser beam. The semicircular boundary is indicated by the broken line.

FIG. 4C shows a SEM (Scanning Electron Microscope) image of the Z-face of the manufactured body 1 after polishing and etching; and FIG. 4D is a schematic view of the structure drawn with reference to FIG. 4C. As shown in FIGS. 4C and 4D, nano-order cells CL were observed. In FIG. 4D, elongated columns are the cells CL, and a crystal grain observed in FIG. 4B is assumed to be formed of the gathered cells CL. In FIG. 4D, a shape appearing to be circular is also the cell CL, but this cell CL appears to be circular because of extending in the depth direction of the paper surface of the figure. In addition, the forms of the structures shown in FIGS. 4C and 4D are similar to a structure which is formed generally by welding, but a thickness of a single cell is approximately 1 μm or smaller, and the length is about several hundred μm, and the structures shown in FIGS. 4C and 4D include cells which are about three to six orders of magnitude small as compared with those of the welded structure.

[Consideration of Mechanical Strength Based on Structure]

FIG. 6A shows a reflected electron image by SEM of the forged and rolled body, and FIG. 6B shows a reflected electron image by SEM of the manufactured body 1. Fine white regions that were not observed in the forged and rolled body (FIG. 6A) were observed in the manufactured body 1 (FIG. 6B). In addition, the left side of FIG. 6C shows a SEM image of Mo of the manufactured body 1 which was observed by SEM, and the right side of FIG. 6C shows an EDX image of Mo of the manufactured body 1 which was observed by EDX (Energy Dispersive X-ray Spectroscopy). By comparing FIG. 6B with FIG. 6C, it is confirmed that the white region observed in FIG. 6B is Mo segregation in which Mo is more enriched than other regions. It is assumed that the Mo segregation is formed between adjacent cell structures, in other words, in a cell boundary.

FIG. 6D shows a reflected electron image by SEM of the manufactured body 2 which has been subjected to the solution treatment, and it is understood that the white region, specifically, the Mo segregation is solid-dissolved in the matrix due to the solution treatment, and a part of the Mo segregation has been lost. However, as described above, the fact that the mechanical properties (yield strength and tensile strength) of the manufactured body 2 are higher than those of the forged and rolled body suggests that the Mo segregation does not completely disappear but appropriately remains, under the heat treatment condition of holding at 1180° C. for 30 minutes.

Figure 7:
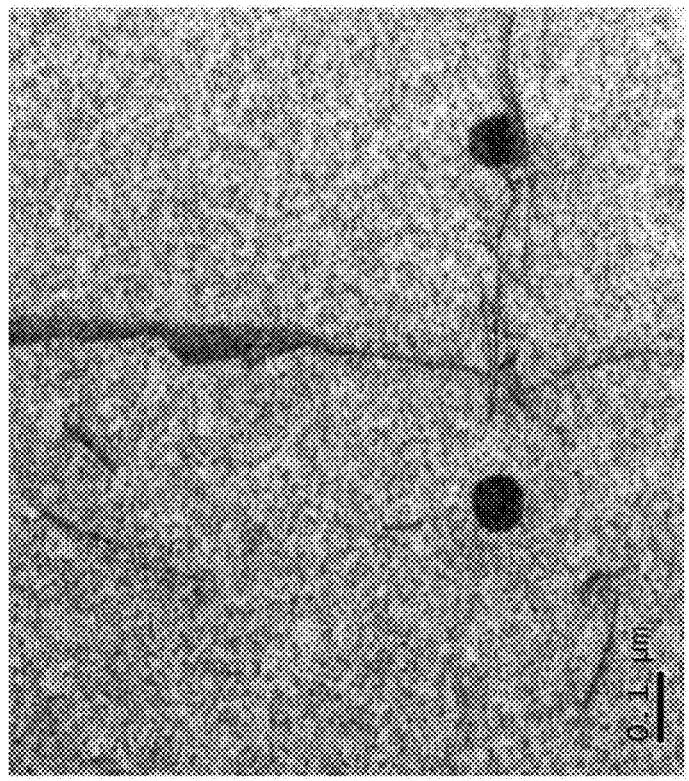
FIG. 7 shows STEM images obtained by the observation of an additively manufactured body 2 that has passed through heat treatment, with a STEM, the left side being a DF-STEM image, and the right side being a BF-STEM image.
Figure 7:
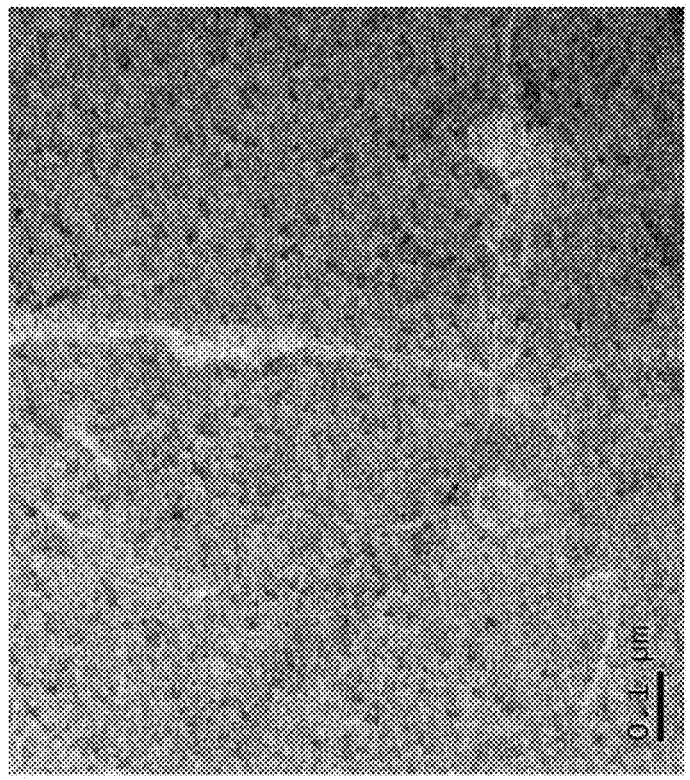

The STEM image of the manufactured body 2 is shown in FIG. 7, which has passed the heat treatment that holds the manufactured body 2 at 1180° C. for 30 minutes and has been observed by STEM (Scanning Transmission Electron Microscopy).

A portion which is shown as a white region in the DF-STEM image on the left side of FIG. 7 is shown as a black region in the BF-STEM image on the right side. In the BF-STEM image on the right side, a black line which clearly extends in the middle is a cell boundary, and it is considered that the Mo segregation exists in the cell boundary.

The manufactured body 1 (unetched) was subjected to electron diffraction, in order to check whether or not the Mo segregation in the manufactured body 1 is a μ phase which is an intermetallic compound containing Mo, Cr and Ni as constituent elements. The result will be described with the use of FIG. 8.

For information, the conditions of the electron diffraction are as follows.

Figure 8A:
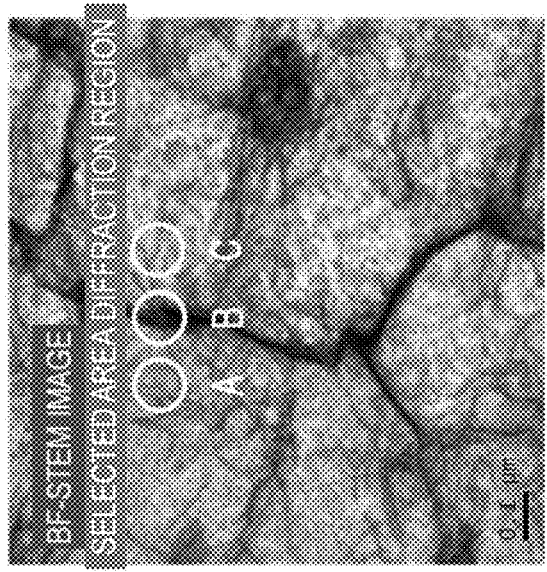
FIG. 8A is a view showing three selected-area diffraction regions when the additively manufactured body 1 (unetched) is subjected to electron diffraction.
Figure 8B:
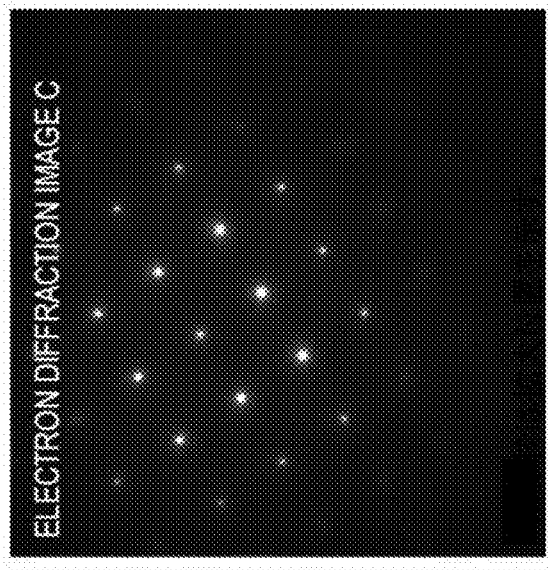
FIG. 8B shows electron diffraction images in the three regions.
Figure 8B:
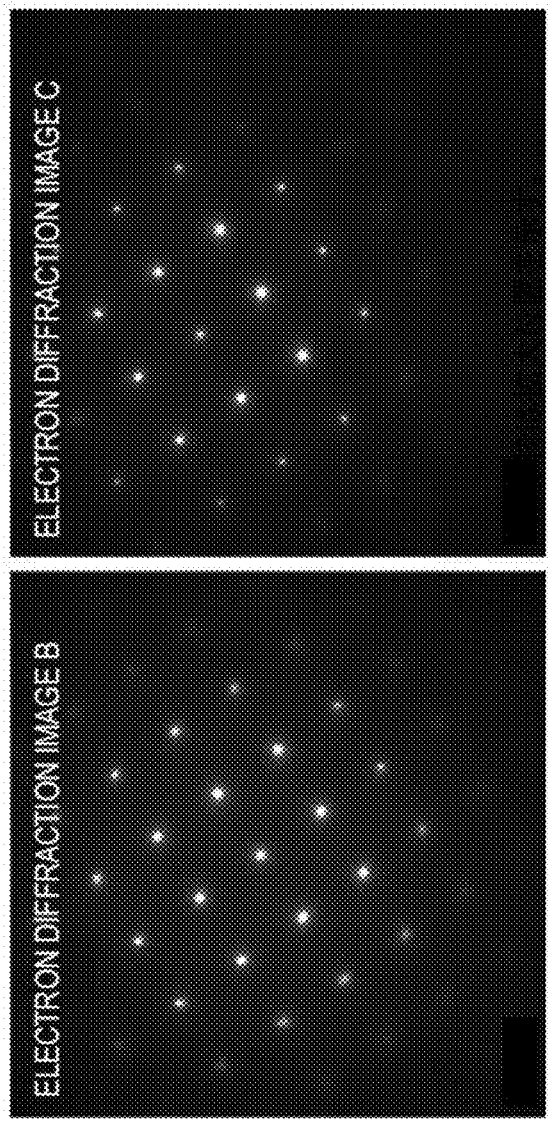
Figure 8B:
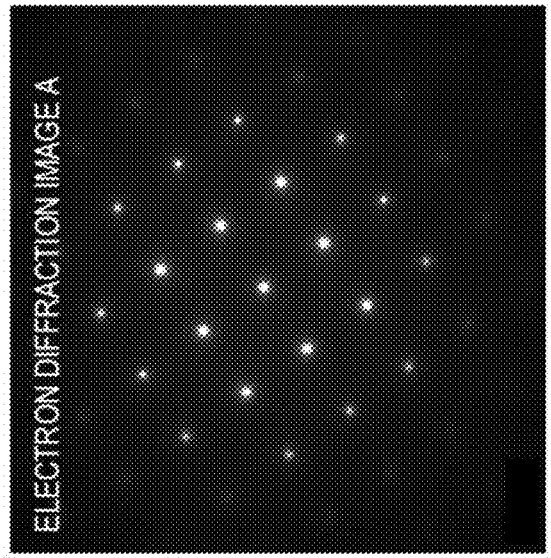

Model of apparatus: model JEM-ARM 200F manufactured by JEOL Ltd.
Acceleration voltage: 200 kV
Selected area diffraction method: aperture size: 0.5 μm ϕ, and camera length: 80 cm As shown in FIG. 8A, selected area diffraction regions are three regions (region A, region B and region C) each surrounded by a white circle. In FIG. 8B, an electron diffraction image A, an electron diffraction image B and an electron diffraction image C are electron diffraction images in the region A, the region B and the region C, respectively.

When the electron diffraction images A to C are compared, it is understood that the diffraction patterns are equal. This means that an intermetallic compound different from the mother phase is not formed in the additively manufactured body (manufactured body 1) also in the region B which is positioned at the cell boundary. Therefore, it has been confirmed that the Mo segregation in the manufactured body 1 is not the above μ phase. The Mo segregation in the manufactured body 1 is assumed to contain mainly a simple substance of Mo. It is understood that by fine Mo segregation appropriately existing between adjacent columnar cell structures, in other words, in the cell boundary, dislocation bonding is inhibited, and that as a result, a state is maintained in which the dislocation density in the cell structure is high, and the mechanical properties are improved.

Figure 9:
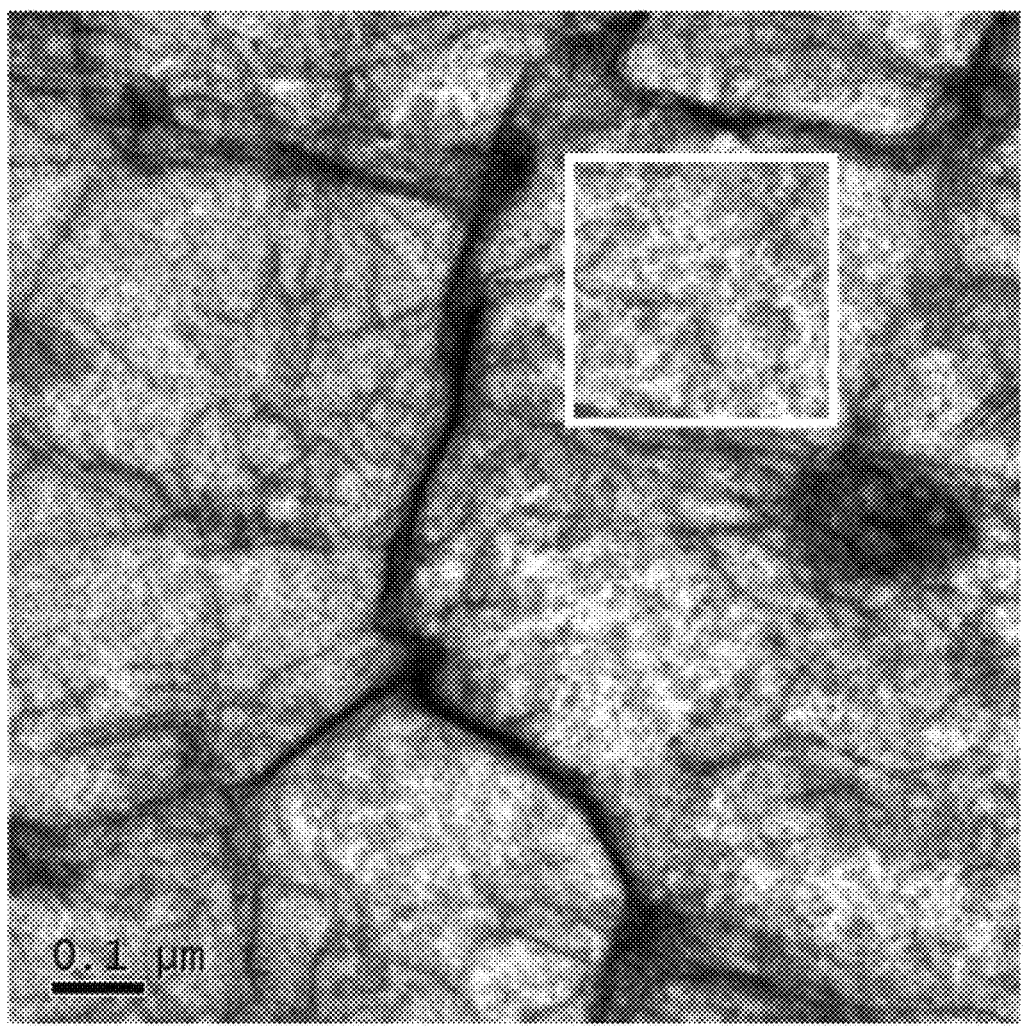
FIG. 9 is a view in which a rectangular box is added to the STEM image (BF-STEM image) shown in FIG. 2. The rectangular box indicates a position of EDX analysis of a mother phase in the crystal grain.

FIG. 9 is a view in which a rectangular box is added to the STEM image (BF-STEM image) of the manufactured body 1, which is shown in FIG. 2. The rectangular box indicates a position at which the mother phase in the crystal grain has been analyzed with EDX.

Figure 10:
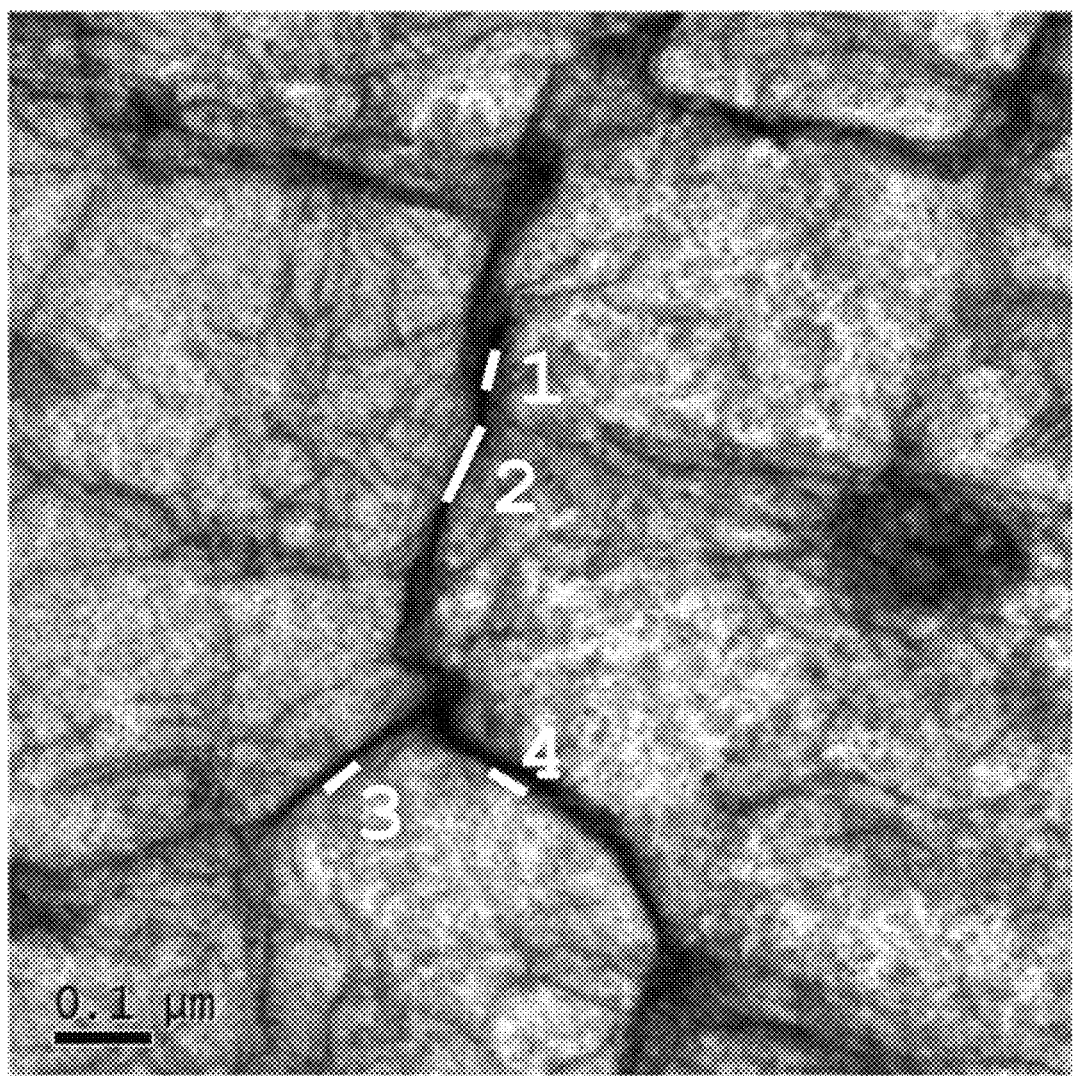
FIG. 10 is a view in which reference numerals 1, 2, 3 and 4 that indicate positions of EDX analysis in cell boundaries are added to the STEM image (BF-STEM image) of the manufactured body 1, which has been shown in FIG. 2.

In addition, FIG. 10 is a view in which reference numerals 1, 2, 3 and 4 that indicate positions in cell boundaries, which have been analyzed with EDX, are added to the STEM image (BF-STEM image) of the manufactured body 1 shown in FIG. 2.

EDX analysis results of the mother phase and the cell boundaries are collectively shown in Table 4.

In Table 4, when the values of Mo are focused on, the Mo concentrations in the cell boundaries are 16.7 to 19.4 at %, and are higher than the Mo concentration in the mother phase (13.7 at %) by 3.0 to 5.7 at %. From this result, it has been confirmed that a region in which the Mo concentration is higher than that in the mother phase exist in the cell boundary at which the plurality of columnar cell structures are adjacent to each other. Specifically, it has been confirmed that in the crystal grains constituting the additively manufactured body 1, the Mo segregation having a Mo concentration higher than that in the mother phase by 3.0 at % or higher and further 5.0 at % or higher exists in the cell boundary.

TABLE 4

| | | EDX analysis value of manufactured body 1 (at %) | | | | | |
|---|---|---|---|---|---|---|---|
| | | Ni | Cr | Mo | Ta | Fe | Co | O |
| Cell boundary | 1 | 56.4 | 21.3 | 19.4 | 0.7 | 1.6 | 0.6 | — |
| | 2 | 57.9 | 21.4 | 18.2 | 0.4 | 1.5 | 0.6 | — |
| | 3 | 58.1 | 21.5 | 17.1 | 0.9 | 1.7 | 0.7 | — |
| | 4 | 59.1 | 21.2 | 16.7 | 0.9 | 1.5 | 0.6 | — |
| Mother phase | | 63.2 | 20.7 | 13.7 | 0.4 | 1.4 | 0.6 | — |

[Behavior Observation of Element in Surface Layer]

Figure 11A:
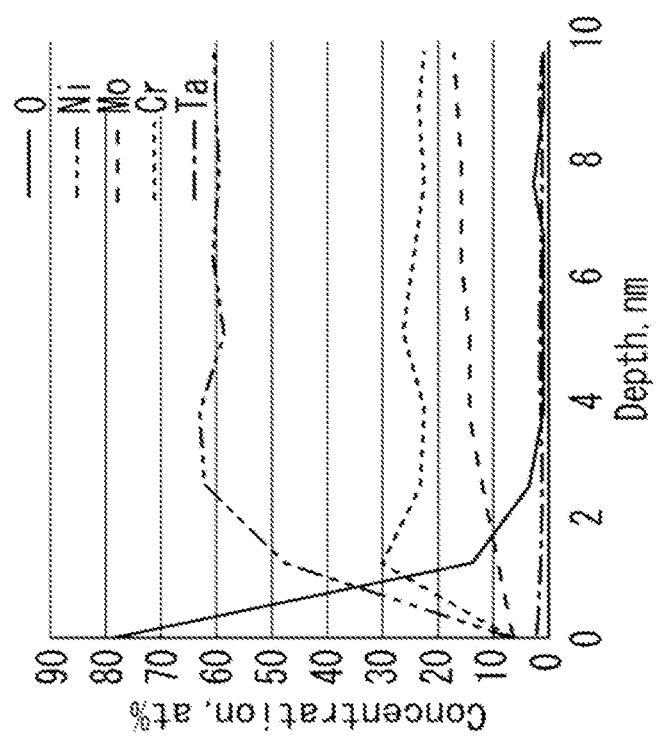
FIGS. 11A and 11B each show an observation result of the behavior of elements in a surface layer portion in Example, FIG. 11A being the observation result of the additively manufactured body which is not polished, and FIG. 11B being the observation result of the additively manufactured body which has been polished.
Figure 11B:
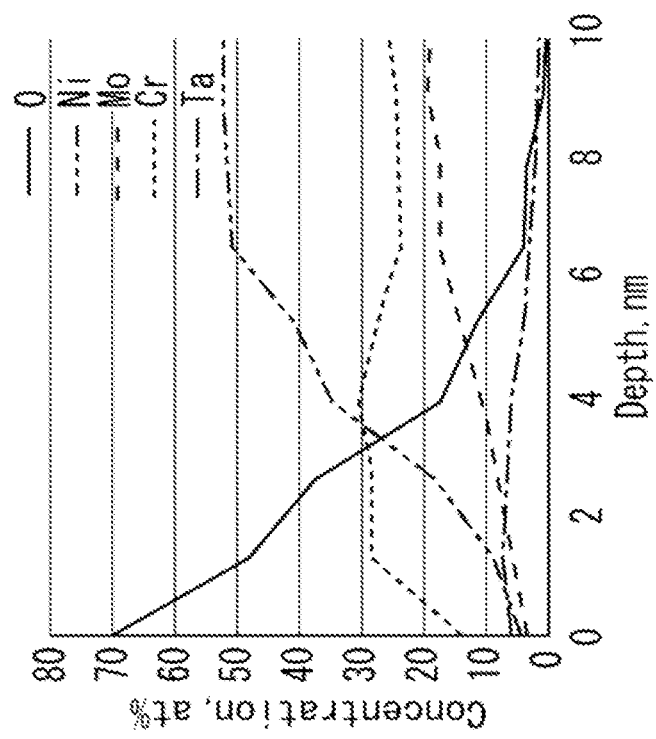

Next, the behavior of elements in the surface layer portion was observed for the manufactured body 1A (unpolished) and the manufactured body 1B (polished). The results are shown in FIGS. 11A and 11B. This observation was performed mainly for recognizing the reason why the corrosion resistance was improved. For information, the observation conditions are as follows.

Apparatus: ESCA-5400R (3057 customized) manufactured by ULVAC-PHI, Inc.
X-Ray (Mg kα): 15.0 kV and 26.7 mA (400 W)
Detection depth: 20 nm (extraction angle 45°)
Analysis region: 800 μm ϕ
Sputtering conditions (Ar$^+$): acceleration voltage; 2 kV, raster size; 3×3 mm, and sputtering rate: about 2.0 nm/min (in terms of $SiO_2$)

As shown in FIG. 11A, it is assumed that a thin film including oxides is formed on the surface layer portion of the manufactured body 1A. Based on the concentration ratio of Cr and O in the surface layer portion, the oxides are recognized to be chromium oxides ($Cr_2O_3$). The chromium oxide is formed in the range down to about 3 nm in the depth direction, based on the oxygen content and the Cr content in the surface layer portion, and a considerable concentration of oxygen is observed even beyond the 3 nm; and accordingly, it is recognized that in the case of the manufactured body Al, the chromium oxide has a thickness of about 6 nm or smaller.

Paying attention on the contents of Cr and Ni in the surface layer portion, the content of Cr is larger than the content of Ni in the region up to the range of about 3 nm from the surface. It is assumed that an oxide of Ni (NiO) is contained in this region; but based on the contents of Cr and Ni, the amount of produced chromium oxide is large; and it is understood that an oxide film is formed in this region, which contains chromium oxide and nickel oxide, but mainly contains Cr.

In a region deeper than about 3 nm from the surface, the Cr content and the Ni content are reversed. Furthermore, when the depth exceeds the depth of approximately 6 nm from the surface, the region becomes a region of metal components in which both of the Cr content and the Ni content become stable. In a region from the point at which the Cr content and the Ni content are reversed to the metal components region of Cr and Ni, the Ni content is larger than the Cr content; and it is understood that an oxide film is formed in the region, which contains chromium oxide and nickel oxide or NiCr oxide, but mainly contains Cr.

As is shown in FIG. 11B, it is assumed that a thin film including oxides is formed in the surface layer portion also in the manufactured body 1B, but the Ni content is larger than the Cr content. Accordingly, it is recognized that in the manufactured body 1B, Cr oxide does not exist in the surface layer portion, or even if Cr oxide exists, the amount of Ni oxide is large and an oxide film is formed which mainly contains Ni. For information, the surface of the manufactured body 1B is polished, but is naturally oxidized by coming in contact with the atmosphere in polishing or after polishing, and thereby oxygen (O) is contained in the surface layer portion.

[Consideration on Corrosion Resistance]

The manufactured body 1A which is not polished after the additive manufacturing exhibits higher corrosion resistance than the manufactured body 1B which has been polished, and oxides are formed in a very shallow range of the surface layer in the manufactured body LA.

It is understood that these oxides are formed during the additive manufacturing; and the oxides originate in oxygen (O₂) which is contained in argon gas (Ar gas) of a shielding gas. The content of oxygen in the argon gas is about 10 to 2000 ppm as described above, which is a very small amount as compared with, for example, about 21% which is the amount of oxygen in the atmosphere. This very small amount of oxygen contained therein is exposed to a high temperature atmosphere of 1300° C. to 1800° C. in which an alloy powder is melted during the additive manufacturing, and thereby a dense oxide is formed. Moreover, the XY-face and the Z-face, in other words, the surface of the additively manufactured body of which the corrosion resistance has been evaluated is scanned twice with a laser beam on the same scanning path. It is understood that the scanning of the laser beam, which is repeated twice, contributes to the formation of a denser oxide.

REFERENCE SIGN LIST 1 additively manufactured body (manufactured body)

The invention claimed is:

1. A Ni-based alloy member comprising:
Ni, Cr, Mo, and Ta, wherein
Ni is at the largest content by a mass ratio,
Cr or Mo is at the second largest contents by a mass ratio,
the Ni-based alloy member is an additively manufactured body, and comprises segregation of Mo in at least a part of a crystal grain(s),
a content of Mo is 16.0% to 23.0% by mass %,
a content of Cr is 18.0% to 24.5% by mass %, and
a content of Ta is 1.0% to 2.5% by mass %
wherein an elongation of the Ni-based alloy member is 50% or higher.

2. The Ni-based alloy member according to claim 1, wherein a mean grain size of the crystal grains is 80 to 150 µm.

3. The Ni-based alloy member according to claim 1, wherein a Vickers hardness of the Ni-based alloy member is 200 HV10 or higher.

4. The Ni-based alloy member according to claim 1, wherein a tensile strength of the Ni-based alloy member is 850 MPa or higher.

5. The Ni-based alloy member according to claim 1, wherein the Ni-based alloy has:
a Vickers hardness of 200 HV10 or higher;
a tensile strength of 850 MPa or higher; and
a yield strength of 400 MPa or higher.

6. The Ni-based alloy member according to claim 1, wherein a Mo concentration in the segregation of Mo is higher than a Mo concentration in a mother phase in the crystal grain(s) by 3 at % or higher.

7. The Ni-based alloy member according to claim 1, wherein
the Ni-based alloy member has an oxide film on a surface layer of the Ni-based alloy member,
the oxide film contains Cr as a constituent element, and
the oxide film has a thickness of 1 nm to 6 nm.

8. The Ni-based alloy member according to claim 7, wherein
Ni is at the largest content by a mass ratio,
Cr is at the second largest content by a mass ratio, and
Mo is at the third largest content by a mass ratio.

9. The Ni-based alloy member according to claim 1, wherein the crystal grain(s) has columnar cell structures, and the segregation of Mo exists between the adjacent columnar cell structures.

10. The Ni-based alloy member according to claim 9, wherein an average diameter of equivalent circle diameters in cross sections of the columnar cell structures is 1000 nm or smaller.

11. The Ni-based alloy member according to claim 9, wherein when the cross sections of the columnar cell structures are observed with a transmission electron microscope, a dislocation density that is obtained by dislocation length/assessed volume is $10^{12}$ m$^{-2}$ or higher, wherein
the assessed volume is observation area x sample thickness.

12. The Ni-based alloy member according to claim 9, wherein a Mo concentration in the segregation of Mo is higher than a Mo concentration in a mother phase in the crystal grain(s) by 3 at % or higher.

13. A manufactured product comprising the Ni-based alloy member according to claim 1.

14. The manufactured product according to claim 13, wherein the manufactured product is a semiconductor manufacturing apparatus.

15. A method for manufacturing the Ni-based alloy member according to claim 1 comprising:
a step of obtaining an additively manufactured body including a Ni-based alloy that includes Ni at the largest content by a mass ratio, Cr or Mo at the second largest contents by a mass ratio, and Ta, by additive manufacturing using a laser beam or an electron beam; wherein
during melting and solidification in the additive manufacturing, a crystal grain(s) having columnar cell structures is formed, and segregation of Mo is formed between the adjacent columnar cell structures in an inner part of the crystal grain(s).

16. The method for manufacturing a Ni-based alloy member according to claim 15, wherein the additively manufactured body is subjected to heat treatment at 800° C. or higher and 1300° C. or lower.

17. The method for manufacturing a Ni-based alloy member according to claim 16, wherein the heat treatment is performed for 0.5 hours or longer and 3 hours or shorter.

18. The method for manufacturing a Ni-based alloy member according to claim 15, wherein aging heat treatment is performed at 600° C. or higher and lower than 800° C.

19. The method for manufacturing a Ni-based alloy member according to claim 18, wherein the aging heat treatment is performed for 20 hours or longer and 100 hours or shorter.

* * * * *